US008568275B2

(12) United States Patent
Inagaki et al.

(10) Patent No.: US 8,568,275 B2
(45) Date of Patent: Oct. 29, 2013

(54) CONTROL DEVICE

(75) Inventors: Nobuaki Inagaki, Nishio (JP); Hiroya Ueno, Anjo (JP); Takeshi Tateishi, Anjo (JP); Nobuhiro Iwai, Anjo (JP); Hiroshi Tsutsui, Nishio (JP)

(73) Assignee: Aisin Aw Co., Ltd., Anjo (JP)

( * ) Notice: Subject to any disclaimer, the term of this patent is extended or adjusted under 35 U.S.C. 154(b) by 437 days.

(21) Appl. No.: 13/053,708

(22) Filed: Mar. 22, 2011

(65) Prior Publication Data
US 2011/0239801 A1 Oct. 6, 2011

(30) Foreign Application Priority Data

Mar. 31, 2010 (JP) ................ 2010-083694

(51) Int. Cl.
*F16H 61/26* (2006.01)
(52) U.S. Cl.
USPC .............................. 477/162; 477/8; 477/166
(58) Field of Classification Search
USPC ......... 477/5, 7, 8, 15, 70, 77, 79, 83, 86, 115, 477/156, 162, 166
See application file for complete search history.

(56) References Cited

U.S. PATENT DOCUMENTS

| 8,337,362 B2* | 12/2012 | Inagaki et al. ............... 477/175 |
| 2003/0186778 A1 | 10/2003 | Yamamoto et al. |
| 2005/0096182 A1* | 5/2005 | Ohta ............................ 477/181 |
| 2011/0239804 A1* | 10/2011 | Hase et al. ................. 74/473.11 |

FOREIGN PATENT DOCUMENTS

| JP | A-01-145467 | 6/1989 |
| JP | A-02-154861 | 6/1990 |
| JP | A-5-288268 | 11/1993 |
| JP | A-2000-152407 | 5/2000 |
| JP | A-2003-278910 | 10/2003 |
| JP | A-2006-153161 | 6/2006 |

OTHER PUBLICATIONS

Mar. 29, 2011 International Search Report issued in PCT/JP2011/052610 (with translation).

* cited by examiner

*Primary Examiner* — Justin Holmes
(74) *Attorney, Agent, or Firm* — Oliff & Berridge, PLC

(57) ABSTRACT

A control device includes an input member drivingly coupled to at least one of an internal combustion engine and a rotating electrical machine as driving force sources of a vehicle. When downshifting or upshifting the control device controls the engagement pressure of a direct coupling clutch to a pressure lower than the direct coupling limit engagement pressure during downshifting, when downshifting in a state in which required input torque, which is torque that is required to be transferred to the input member, is set to a positive torque, and the control device controls the engagement pressure of the direct coupling clutch to a pressure equal to or higher than the direct coupling limit engagement pressure during downshifting or upshifting, when performing downshifting in a state in which the required input torque is set to a negative torque, or when performing upshifting regardless of the required input torque.

8 Claims, 7 Drawing Sheets

CONTROL DEVICE

INCORPORATION BY REFERENCE

The disclosure of Japanese Patent Application No. 2010-083694 filed on Mar. 31, 2010 including the specification, drawings and abstract is incorporated herein by reference in its entirety.

BACKGROUND OF THE INVENTION

The present invention relates to control devices for controlling a hybrid vehicle drive device that includes an input member drivingly coupled to at least one of an internal combustion engine and a rotating electrical machine as driving force sources of a vehicle, an output member drivingly coupled to wheels, and a hydraulic coupling with a direct coupling clutch for transmitting rotation of the input member to a shift input member, and a speed change mechanism for shifting rotation of the shift input member at a speed ratio of a gear-shift stage that is selectively formed, and transmitting the shifted rotation to the output member.

DESCRIPTION OF THE RELATED ART

For example, a device described in Japanese Patent Application Publication No. JP-A-2003-278910 below is known as a transmission device for hybrid vehicles including an internal combustion engine and a rotating electrical machine as driving force sources. This transmission device outputs regenerative torque to the rotating electrical machine at the time of deceleration of the vehicle, and decelerates the vehicle at a predetermined deceleration to brake the vehicle, while collecting kinetic energy as electric energy, thereby reducing fuel consumption. At this time, the technique of Japanese Patent Application Publication No. JP-A-2003-278910 performs the regenerative operation with the direct coupling clutch being in an engaged state, thereby eliminating limitations of the regenerative torque due to the presence of the hydraulic coupling. Thus, the kinetic energy can be efficiently converted to regenerative energy.

SUMMARY OF THE INVENTION

In the technique of Japanese Patent Application Publication No. JP-A-2003-278910, however, when performing a downshift according to a shift map while deceleration regeneration is being performed, the direct coupling clutch is controlled from an engaged state to a disengaged state in order to prevent generation of torque shock associated with the downshift. Thus, in the technique of Japanese Patent Application Publication No. JP-A-2003-278910, the regenerative torque is limited during the period of the downshift, whereby the regeneration efficiency is reduced.

Thus, it is desired to implement a control device capable of preventing reduction in regeneration efficiency and reducing generation of torque shock associated with a shift operation by appropriately controlling engagement and disengagement of the direct coupling clutch when performing the shift operation of the speed change mechanism in the engaged state of the direct coupling clutch.

A control device according to a first aspect of the present invention is a control device for controlling a hybrid vehicle drive device that includes an input member drivingly coupled to at least one of an internal combustion engine and a rotating electrical machine as driving force sources of a vehicle, an output member drivingly coupled to a wheel, a fluid coupling with a direct coupling clutch for transmitting rotation of the input member to a shift input member, and a speed change mechanism for shifting rotation of the shift input member at a speed ratio of a gear-shift stage that is selectively formed, and transmitting the shifted rotation to the output member. In the control device, when performing a downshift to a gear-shift stage of a higher speed ratio or an upshift to a gear-shift stage of a lower speed ratio in the speed change mechanism from a state in which an engagement pressure of the direct coupling clutch is equal to or higher than a direct coupling limit engagement pressure that is an engagement pressure at which the direct coupling clutch starts to slip, the control device controls the engagement pressure of the direct coupling clutch to a pressure lower than the direct coupling limit engagement pressure during the downshift, when performing the downshift in a state in which required input torque, which is torque that is required to be transferred to the input member, is set to a positive torque, and the control device controls the engagement pressure of the direct coupling clutch to a pressure equal to or higher than the direct coupling limit engagement pressure during the downshift or the upshift, when performing the downshift in a state in which the required input torque is set to a negative torque, or when performing the upshift regardless of the required input torque.

Note that as used herein, the term "speed ratio" indicates the ratio between the rotational speed of the input member and the rotational speed of the output shaft, which is defined by the number of teeth of each gear forming each gear-shift stage, or the like, in the case where each gear-shift stage is formed in the speed change mechanism. In the present application, the "speed ratio" is the rotational speed of the input member divided by the rotational speed of the output member.

As used herein, the term "drivingly coupled" indicates the state in which two rotating elements are coupled together so as to be able to transmit driving force therebetween. This term is used as a concept including the state in which the two rotating elements are coupled together so as to rotate together, or the state in which the two rotating elements are connected together so as to be able to transmit driving force therebetween via one or more transmission members. Such transmission members include various members for transmitting rotation at the same speed or at a shifted speed, and include, e.g., shafts, gear mechanisms, engagement elements, belts, chains, etc.

As used herein, the term "rotating electrical machine" is used as a concept including a motor (an electric motor), a generator (an electric generator), and a motor-generator that functions both as the motor and the generator as necessary.

Performing a downshift in the state in which the required input torque is set to a positive torque (power-on downshift) generally corresponds to the case where a downshift is performed by increasing the accelerator operation amount. In this case, the rotating electrical machine does not perform regeneration by the rotation driving force that is transmitted from the wheel, and the probability is low that the accelerator operation amount is reduced during the downshift and the shift to the regeneration occurs. Thus, it is less necessary to maintain the direct coupling clutch in the engaged state without slipping, in order to increase the regeneration efficiency in the power-on downshift. Moreover, the power-on downshift is often performed when the required input torque increases rapidly. Moreover, the shift operation need be performed in a short time when performing the power-on downshift. Thus, in the engaged state of the direct coupling clutch, it is difficult to perform the shift operation in a short time without causing torque shock. According to the above characteristic structure, when performing the power-on downshift in the engaged state of the direct coupling clutch, the direct coupling clutch is temporarily caused to slip during the shift operation, whereby the torque shock and the shift time can be reduced.

Performing a downshift in the state in which the required input torque is set to a negative torque (power-off downshift) generally corresponds to the case where a downshift is performed by reducing the vehicle speed. In this case, the output torque of the rotating electrical machine is set to regenerative torque. Thus, according to the above characteristic structure, when performing the power-off downshift in the engaged state of the direct coupling clutch, the engagement pressure of the direct coupling clutch is controlled to a pressure equal to or higher than the direct coupling limit engagement pressure, and the engaged state of the direct coupling clutch is maintained. Thus, the possibility can be reduced that the regeneration efficiency may be reduced during the shift operation.

Performing an upshift in the state in which the required input torque is set to a negative torque (power-off upshift) generally corresponds to the case where an upshift is performed by reducing the accelerator operation amount. In this case, the output torque of the rotating electrical machine is set to regenerative torque. Thus, according to the above characteristic structure, when performing the power-off upshift in the engaged state of the direct coupling clutch, the engagement pressure of the direct coupling clutch is controlled to a pressure equal to or higher than the direct coupling limit engagement pressure, and the engaged state of the direct coupling clutch is maintained. Thus, the possibility can be reduced that the regeneration efficiency may be reduced during the shift operation. Since the power-off upshift is performed at the time of deceleration, it is less necessary to reduce the shift period as in the power-on downshift, and also the absolute value of the negative required input torque is relatively small. Thus, torque shock due to the shift operation is less likely to increase, and it is less necessary to reduce the torque shock by causing slipping of the direct coupling clutch.

Performing an upshift in the state in which the required input torque is set to a positive torque (power-on upshift) corresponds to the case where an upshift is performed by increasing the vehicle speed. In this case, the rotating electrical machine does not perform regeneration by the rotation driving force that is transmitted from the wheel, but the probability is relatively high that the accelerator operation amount is reduced during the upshift and the shift to the regeneration occurs. Moreover, an increase in required input torque during the shift operation is relatively small, and the shift operation in a short time is not required. Thus, the shift operation can be performed in the engaged state of the direct coupling clutch, while reducing generation of torque shock. Thus, according to the above characteristic structure, when performing the power-on upshift in the engaged state of the direct coupling clutch, the engagement pressure of the direct coupling clutch is controlled to a pressure equal to or higher than the direct coupling limit engagement pressure, and the engaged state of the direct coupling clutch is maintained. Thus, the possibility can be reduced that the regeneration efficiency may be reduced if the shift to the regeneration occurs during the upshift.

Thus, according to the above characteristic structure, the engagement pressure of the direct coupling clutch during the shift operation is appropriately controlled in the engaged state of the direct coupling clutch, according to the sign (positive or negative) of the required input torque, and to the shift direction. Thus, the possibility can be reduced that the regeneration efficiency during the shift operation may be reduced, and generation of torque shock during the shift operation can be reduced.

According to a second aspect of the present invention, when performing the downshift in the state in which the required input torque is set to the positive torque, the control device may control the engagement pressure of the direct coupling clutch to a slipping engagement pressure at which slipping occurs, during the downshift, and the slipping engagement pressure be set to a larger pressure as an absolute value of the required input torque increases.

According to the second aspect, if slipping of the direct coupling clutch is caused by reducing the engagement pressure thereof during the power-on downshift, the inertia on the input member side of the direct coupling clutch is separated from the inertia on the output member side thereof, and the inertia that acts on the shift input member decreases by an amount corresponding to the inertia on the input member side such as the rotating electrical machine and the engine. Thus, causing the slipping of the direct coupling clutch reduces the inertia that acts on the shift input member, whereby the control accuracy and responsiveness of the rotational speed of the shift input member can be increased. Thus, torque shock can be reduced, and the shift period can be reduced.

According to this structure, the torque that is transferred from the input member to the shift input member and the speed change mechanism via the direct coupling clutch can be appropriately increased according to the magnitude of the required input torque, whereby the possibility can be reduced that the torque that is transferred toward the wheel during the downshift may be significantly reduced with respect to the required input torque. Moreover, the torque that is transferred to the shift input member can be increased according to the magnitude of the required input torque, and the time it takes to reengage the direct coupling clutch after the shift operation can be reduced.

According to a third aspect of the present invention, when performing the downshift in the state in which the required input torque is set to the negative torque, the control device may control the engagement pressure of the direct coupling clutch to a direct coupling engagement pressure that is equal to or higher than the direct coupling limit engagement pressure during the downshift, and the direct coupling engagement pressure be set to a larger pressure as the absolute value of the required input torque increases.

Like the direct coupling engagement pressure, the direct coupling limit engagement pressure increases as the absolute value of the required input torque increases. According to this structure, the direct coupling engagement pressure can be set to a pressure close to the direct coupling limit engagement pressure. Thus, the engagement pressure of the direct coupling clutch can be changed to the slipping engagement pressure without delay during the downshift, even if the required input torque changes from negative to positive during the power-off downshift. Thus, generation of torque shock during the downshift can be prevented.

According to a fourth aspect of the present invention, when performing the upshift regardless of the required input torque, the control device may control the engagement pressure of the direct coupling clutch to an upshift direct coupling engagement pressure that is equal to or higher than the direct coupling limit engagement pressure during the upshift, the upshift direct coupling engagement pressure be set to a full engagement pressure regardless of a magnitude of the required input torque, and the full engagement pressure be a pressure at which the direct coupling clutch does not slip even when the required input torque has a maximum value.

According to the fourth aspect, the engagement pressure of the direct coupling clutch can be maintained at the full engagement pressure during the upshift as well, in the case where the engagement pressure of the direct coupling clutch is set to the full engagement pressure before and after the upshift. This can prevent the engagement pressure of the direct coupling clutch from varying unnecessarily during the upshift, whereby the direct coupling clutch can be stably maintained in the engaged state.

DETAILED DESCRIPTION OF THE EMBODIMENT

Figure 1:
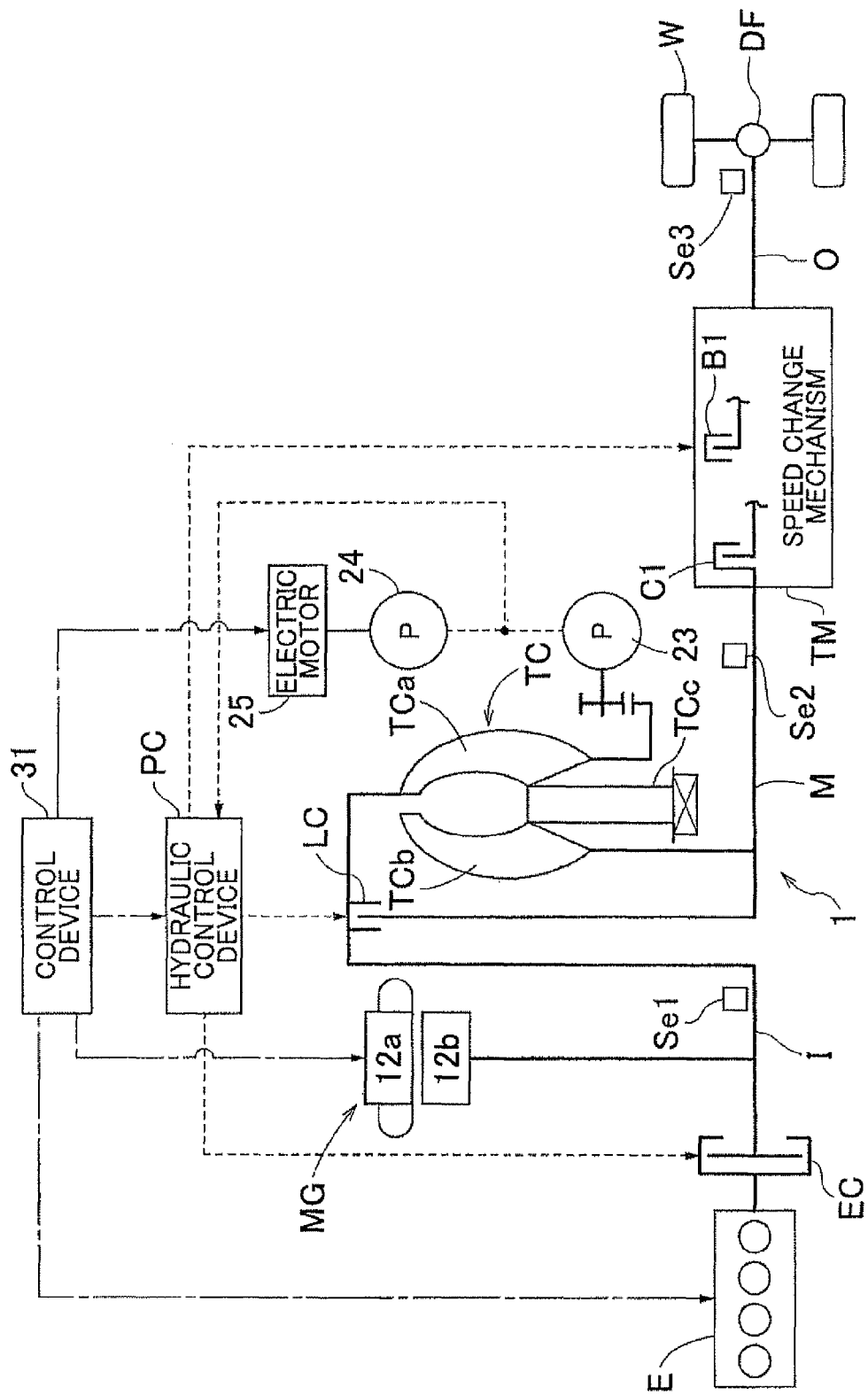
FIG. 1 is a schematic diagram showing the structure of a hybrid vehicle drive device according to an embodiment of the present invention.

An embodiment of a control device 31 according to the present invention will be described below with reference to the accompanying drawings. FIG. 1 is a schematic diagram showing the general structure of a hybrid vehicle drive device 1 according to the present embodiment. As shown in the drawing, a vehicle according to the present invention is a hybrid vehicle including as driving force sources both an engine E as an internal combustion engine and a rotating electrical machine MG. The hybrid vehicle drive device 1 includes an input shaft I that is drivingly coupled to at least one of the engine E and the rotating electrical machine MG, an output shaft O that is drivingly coupled to wheels W, a torque converter TC with a lockup clutch LC, which transmits rotation of the input shaft I to an intermediate shaft M, and a speed change mechanism TM that shifts rotation of the intermediate shaft M at a speed ratio of a gear-shift stage that is selectively formed, and transmits the shifted rotation to the output shaft O. Hereinafter the hybrid vehicle drive device 1 will be simply referred to as the "drive device 1." The control device 31 controls the drive device 1. The drive device 1 further includes a hydraulic control device PC for supplying hydraulic oil having a predetermined oil pressure to the lockup clutch LC, clutches and brakes of the speed change mechanism TM, and the like. The drive device 1 further includes an input shaft rotational speed sensor Se1, an intermediate shaft rotational speed sensor Se2, and an output shaft rotational speed sensor Se3, which detect the rotational speeds of the input shaft I, the intermediate shaft M, and the output shaft O, respectively. Note that in FIG. 1, solid lines represent transmission paths of driving force (torque), broken lines represent supply paths of oil pressures, and chain lines represent transmission paths of electric signals. The input shaft I corresponds to an "input member" in the present invention, the intermediate shaft M corresponds to a "shift input member" in the present invention, the output shaft O corresponds to an "output member" in the present invention, the lockup clutch LC corresponds to a "direct coupling clutch" in the present invention, and the torque converter TC corresponds to a "fluid coupling" in the present invention.

In such a structure, the control device 31 of the present embodiment is characterized by its control that is performed when performing a downshift to a gear-shift stage having a higher speed ratio in the speed change mechanism TM, or performing an upshift to a gear-shift stage having a lower speed ratio, from the state in which the engagement pressure of the lockup clutch LC is equal to or higher than a direct coupling limit engagement pressure. The direct coupling limit engagement pressure is an engagement pressure at which the lockup clutch CL starts to slip.

That is, in the case of performing a downshift when required input torque, which is the torque required to be transferred to the input shaft I, is set to a positive torque, the control device 31 controls the engagement pressure of the lockup clutch LC to a pressure lower than the direct coupling limit engagement pressure during the downshift. In the case of performing a downshift when the required input torque is set to a negative torque, or in the case of performing an upshift regardless of the required input torque, the control device 31 controls the engagement of the lockup clutch CL to a pressure equal to or higher than the direct coupling limit engagement pressure during the downshift or the upshift. The drive device 1 and the control device 31 according to the present embodiment will be described in detail below.

1. Structure of Drive Transmission System of Hybrid Vehicle Drive Device

First, the structure of a drive transmission system of the drive device 1 according to the present embodiment will be described. As shown in FIG. 1, the drive device 1 is a drive device for parallel-type hybrid vehicles which include the engine E and the rotating electrical machine MG as driving force sources of the vehicle, and in which the engine E and the rotating electrical machine MG are drivingly connected in series. The drive device 1 includes the torque converter TC and the speed change mechanism TM. By using the torque converter TC and the speed change mechanism TM, the drive device 1 shifts the rotational speeds of the engine E and the rotating electrical machine MG as the driving force sources and converts the torque thereof to transmit the shifted rotational speeds and the converted torque to the output shaft O.

The engine E is an internal combustion engine that is driven by fuel combustion. For example, various known engines such as a gasoline engine and a diesel engine can be used as the engine E. In this example, an output rotating shaft such as a crankshaft of the engine E is drivingly coupled to the input shaft I via a transmission clutch EC. Thus, the input shaft I is selectively drivingly coupled to the engine E via the transmission clutch EC. The transmission clutch EC is a friction engagement element that is supplied with hydraulic oil having its oil pressure regulated by the hydraulic control device PC, and is controlled by a hydraulic control valve, not shown, to be engaged or disengaged. Note that it is also preferable that the output rotating shaft of the engine E be integrally drivingly coupled to the input shaft I, or be drivingly coupled to the input shaft I via other member such as a damper.

The rotating electrical machine MG has a stator 12a fixed to a case, not shown, and a rotor 12b rotatably supported radially inside the stator 12a. The rotor 12b of the rotating electrical machine MG is drivingly coupled to the input shaft I so as to rotate together with the input shaft I. That is, the present embodiment is structured so that both the engine E and the rotating electrical machine MG are drivingly coupled to the input shaft I. The rotating electrical machine MG is electrically connected to a battery (not shown) as an electricity storage device. The rotating electrical machine MG is capable of functioning as a motor (an electric motor) that is supplied with electric power to generate motive power, and as a generator (an electric generator) that is supplied with motive power to generate electric power. That is, the rotating electrical machine MG is supplied with the electric power from the battery for power running, or stores in the battery the electric power generated by the rotation driving force transmitted from the engine E and the wheels W. Note that the battery is an example of the electricity storage device, and other electricity storage device such as a capacitor may be used, or a plurality of types of electricity storage devices may be used. Note that hereinafter electric power generation by the rotating electrical machine MG is referred to as "regeneration," and negative torque that is output from the rotating electrical machine MG during the electric power generation is referred to as "regenerative torque."

In this drive device 1, in the case where the required input torque is negative torque, the rotating electrical machine MG generates electric power by the rotation driving force transmitted from the wheels W, while outputting regenerative torque.

The torque converter TC is drivingly coupled to the input shaft I. The torque converter TC is a device that transmits the rotation driving force of the input shaft I drivingly coupled to the engine E and the rotating electrical machine MG as the driving force sources, to the speed change mechanism TM via the intermediate shaft M. The torque converter TC includes a pump impeller TCa as an input-side rotating member drivingly coupled to the input shaft I, a turbine runner TCb as an output-side rotating member drivingly coupled to the intermediate shaft M, and a stator TCc provided between the pump impeller TCa and the turbine runner TCb and including a one-way Clutch. The torque converter TC transmits driving force between the driving pump impeller TCa and the driven turbine runner TCb via hydraulic oil that fills the torque converter TC.

The torque converter TC includes the lockup clutch LC as a friction engagement element for lockup. The lockup clutch LC is a clutch that couples the pump impeller TCa to the turbine runner TCb so that the pump impeller TCa rotates together with the turbine runner TCb, in order to eliminate the difference in rotational speed (slipping) between the pump impeller TCa and the turbine runner TCb to increase the transmission efficiency. Thus, when the lockup clutch LC is in an engaged state, the torque converter TC directly transmits the driving force of the driving force source (the input shaft I) to the speed change mechanism TM (the intermediate shaft M) without using the hydraulic oil. In this engaged state, the input shaft I rotates together with the intermediate shaft M, and the input shaft I and the intermediate shaft M rotate at the same rotational speed. Hydraulic oil having its oil pressure regulated by the hydraulic control device PC is supplied to the torque converter TC including the lockup clutch LC.

The speed change mechanism TM is drivingly coupled to the intermediate shaft M as an output shaft of the torque converter TC. That is, the intermediate shaft M functions as an input shaft of the speed change mechanism TM. The speed change mechanism TM is a stepped automatic transmission device having a plurality of gear-shift stages having different speed ratios. In order to form the plurality of gear-shift stages, the speed change mechanism TM includes a gear mechanism such as a planetary gear mechanism, and a plurality of friction engagement elements B1, C1, . . . . In this example, the plurality of friction engagement elements B1, C1, . . . are engagement elements such as clutches and brakes, each having a friction material. These friction engagement elements B1, C1, . . . are clutches (including brakes; the same applies to the following description) capable of continuously controlling an increase and decrease in torque transfer capacity by controlling an oil pressure that is supplied. For example, wet multi-plate clutches or the like are preferably used as such clutches.

FIG. 1 schematically shows a first clutch C1 and a first brake B1 as an example of the plurality of friction engagement elements. By switching engagement or disengagement of the plurality of friction engagement elements, the rotating states of a plurality of rotating elements of the gear mechanism are switched, whereby the gear-shift stage is switched.

When shifting the gear-shift stage, a so-called engagement/disengagement shift operation is performed, which is an operation of disengaging one (hereinafter referred to as the "disengagement-side element") of the friction engagement elements that are engaged before the shift operation, and engaging one (hereinafter referred to as the "engagement-side element") of the friction engagement elements that are disengaged before the shift operation. A downshift of the gear-shift stage formed by the speed change mechanism TM from a higher gear-shift stage having a lower speed ratio (e.g., the fifth speed) to a lower gear-shift stage having a higher speed ratio (e.g., the fourth speed), and an upshift from a lower gear-shift stage having a higher speed ratio (e.g., the fourth speed) to a higher gear-shift stage having a lower speed ratio (e.g., the fifth speed) will be described below.

The speed change mechanism TM shifts the rotational speed of the intermediate shaft M and converts the torque thereof at a predetermined speed ratio that is determined for each gear-shift stage, and transmits the shifted rotational speed and the converted torque to the output shaft O. The torque transferred from the speed change mechanism TM to the output shaft O is distributed and transferred to the two wheels W, namely the left and right wheels W, via a differential unit DF. Note that in this example, the drive device 1 has a uniaxial structure in which the intermediate shaft M and the output shaft O are positioned coaxially. Note that in this example, the drive device 1 has a uniaxial structure in which all of the input shaft I, the intermediate shaft M, and the output shaft O are positioned coaxially.

In the present embodiment, the lockup clutch LC, each clutch of the speed change mechanism TM, and the transmission clutch EC are friction engagement elements, and torque is transferred between input and output members thereof by using the friction between the input and output members. The torque transfer capacity is the magnitude of the maximum torque that can be transferred by the friction engagement element by using the friction. If there is a difference in rotational speed (slipping) between the input and output members of the friction engagement element, the torque corresponding to the magnitude of the torque transfer capacity is transferred from the member having a higher rotational speed to the member having a lower rotational speed. If there is no difference in rotational speed (slipping) between the input and output members of the friction engagement element, the friction engagement element transfers the torque acting on the input and output members of the friction engagement element, with the upper limit being the magnitude of the torque transfer capacity. The magnitude of the torque transfer capacity changes in proportion to the engagement pressure of the friction engagement element. The engagement pressure is a pressure with which the input-side friction plate and the output-side friction plate are pressed against each other. In the present embodiment, the engagement pressure changes in proportion to the magnitude of the oil pressure being supplied. That is, in the present embodiment, the magnitude of the torque transfer capacity changes in proportion to the magnitude of the oil pressure being supplied to the friction engagement element.

Each friction engagement element includes a return spring, and is biased to the disengagement side by the reaction force of the spring. If the force that is generated by the oil pressure supplied to each friction engagement element exceeds the reaction force of the spring, the torque transfer capacity starts to be generated in each friction engagement element, and each friction engagement element changes from the disengaged state to the engaged state. The oil pressure at which the torque transfer capacity starts to be generated is called a "stroke end pressure." Each friction engagement element is structured so that the torque transfer capacity increases in proportion to an increase in oil pressure after the supplied oil pressure exceeds the stroke end pressure.

2. Structure of Hydraulic Control System

A hydraulic control system of the drive device 1 described above will be described below. As shown in FIG. 1, the hydraulic control system includes two types of pumps, namely a mechanical pump 23 and an electric pump 24, as hydraulic oil sources for sucking hydraulic oil stored in an oil pan, not shown, and supplying the hydraulic oil to each part of the drive device 1. The mechanical pump 23 is drivingly coupled to the input shaft I via the pump impeller TCa of the torque converter TC, and is driven by the rotation driving force of one or both of the engine E and the rotating electrical machine MG. The electric pump 24 is an oil pump that is operated by the driving force of an electric motor 25 for driving pumps. The electric motor 25 that drives the electric pump 24 is electrically connected to a battery, and is supplied with electric power from the battery to generate driving force. The electric pump 24 is a pump for assisting the mechanical pump 23, and operates in the state in which a required amount of oil is not supplied from the mechanical pump 23, such as while the vehicle is stopped or while the vehicle is moving at a low speed.

The hydraulic control system further includes the hydraulic control device PC for regulating the oil pressure of the hydraulic oil supplied from the mechanical pump 23 and the electric pump 24 to a predetermined pressure. Although detailed description is omitted, the hydraulic control device PC adjusts the opening of one or more regulating valves based on a signal pressure from a linear solenoid valve for regulating an oil pressure, thereby adjusting the amount of hydraulic oil that is drained from the regulating valve or valves, and thus regulating the oil pressure of the hydraulic oil to one or more predetermined pressures. The hydraulic oil thus regulated to the predetermined pressure(s) is supplied to the transmission clutch EC, the lockup clutch LC, the torque converter TC, and the plurality of friction engagement elements C1, B1, . . . of the speed change mechanism TM, at oil pressure levels respectively required.

3. Structure of Control Device

Figure 2:
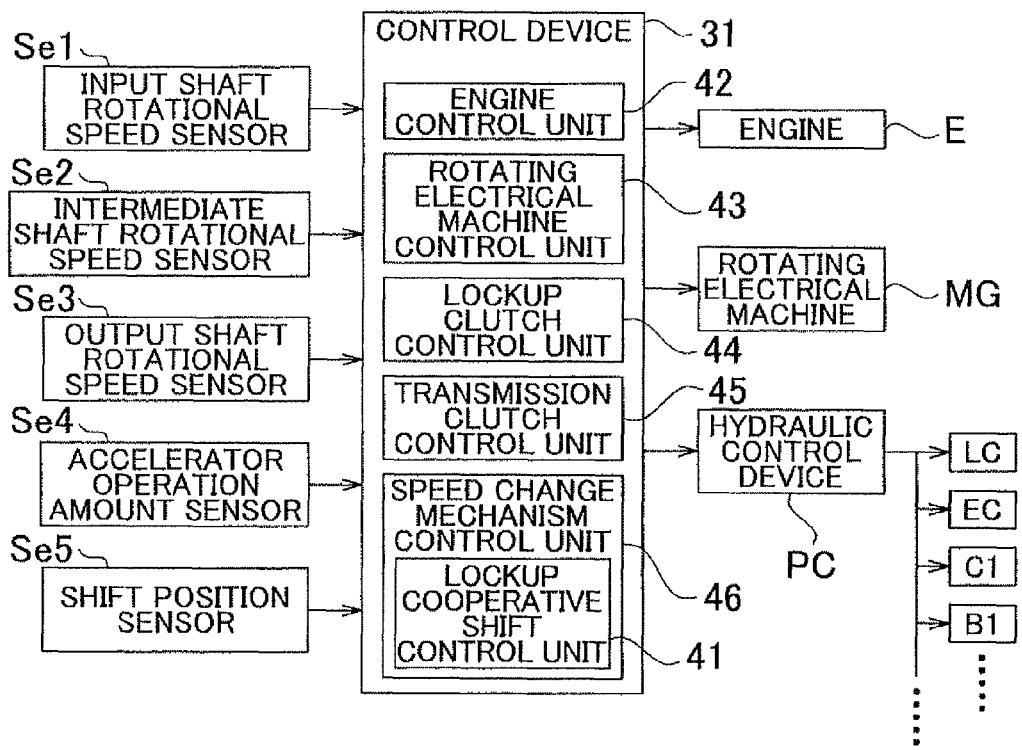
FIG. 2 is a block diagram showing the structure of a control device according to an embodiment of the present invention.

The structure of the control device 31 according to the present embodiment will be described below. As shown in FIG. 2, the control device 31 functions as a core member that controls the operation of each part of the drive device 1. The control device 31 includes an arithmetic processing unit, such as a CPU, as a core member, and also has a storage device such as a random access memory (RAM) capable of reading and writing data from and to the arithmetic processing unit, and a read only memory (ROM) capable of reading data from the arithmetic processing unit, and the like (not shown). Function units 41 to 46 of the control device 31 are formed by one or both of software (programs) stored in the ROM or the like, and hardware such as an arithmetic circuit provided separately. The function units 41 to 46 are structured so as to be able to send and receive information to and from each other.

The drive device 1 includes sensors Se1 to Se5, and electric signals that are output from each sensor are input to the control device 31. The control device 31 calculates detection information of each sensor based on the input electric signals.

The input shaft rotational speed sensor Se1 is a sensor for detecting the rotational speed of the input shaft I. Since the rotor 12b of the rotating electrical machine MG is integrally drivingly coupled to the input shaft I, the control device 31 calculates the rotational speed of the input shaft I and the rotating electrical machine MG from the input signal of the input shaft rotational speed sensor Se1. The intermediate shaft rotational speed sensor Se2 is a sensor for detecting the rotational speed of the intermediate shaft M. The control device 31 calculates the rotational speed of the intermediate shaft M from the input signal of the intermediate shaft rotational speed sensor Se2. The output shaft rotational speed sensor Se3 is a sensor for detecting the rotational speed of the output shaft O. The control device 31 calculates the rotational speed of the output side of the speed change mechanism TM from the input signal of the output shaft rotational speed sensor Se3. Since the rotational speed of the output shaft O is in proportion to the vehicle speed, the control device 31 calculates the vehicle speed from the input signal of the output shaft rotational speed sensor Se3. The accelerator operation amount sensor Se4 is a sensor for detecting the accelerator operation amount by detecting the amount by which an accelerator pedal is operated by the driver. The control device 31 calculates the accelerator operation amount from the input signal of the accelerator operation amount sensor Se4.

The shift position sensor Se5 is a sensor for detecting the selected position (the shift position) of a shift lever. The control device 31 detects which driving range out of the "drive range," the "second range," the "low range," and the like has been designated by the driver, based on the input information from the shift position sensor Se5.

As shown in FIG. 2, the control device 31 includes an engine control unit 42, a rotating electrical machine control unit 43, a lockup clutch control unit 44, a transmission clutch control unit 45, and a speed change mechanism control unit 46. The speed change mechanism control unit 46 includes a lockup cooperative shift control unit 41 as its subordinate function unit. The function units 41 to 46 of the control device 31 will be described in detail below.

3-1. Engine Control Unit

The engine control unit 42 is a function unit that controls the operation of the engine E. The engine control unit 42 performs a process of determining an engine operating point, and controlling the engine E so that the engine E operates at the engine operating point. The engine operating point is a control command value indicating a control target point of the engine E, and is determined by the rotational speed and the torque. The engine control unit 42 controls the engine E so that the engine E operates at the torque and the rotational speed that are indicated by the engine operating point. In the present embodiment, if the required input torque is negative torque, the engine control unit 42 stops fuel supply to the engine E, and controls the engine E to a stopped state.

3-2. Rotating Electrical Machine Control Unit

The rotating electrical machine control unit 43 is a function unit that controls the operation of the rotating electrical machine MG. The rotating electrical machine control unit 43 performs a process of determining a rotating electrical machine operating point, and controlling the rotating electrical machine MG so that the rotating electrical machine MG operates at the rotating electrical machine operating point. The rotating electrical machine operating point is a control command value indicating a control target point of the rotating electrical machine MG, and is determined by the rotational speed and the torque. More specifically, the rotating electrical machine operating point is a command value indicating a control target value of the rotating electrical machine MG which is determined in view of the required vehicle output and the engine operating point, and determined by the rotational speed command value and the torque command value. The rotating electrical machine control unit 43 controls the rotating electrical machine MG so that the rotating electrical machine MG operates at the torque and the rotational speed that are indicated by the rotating electrical, machine operating point. In the present embodiment, if the required input torque is negative torque, the rotating electrical machine control unit 43 sets the torque command value to regenerative torque of the negative torque, and performs regeneration. Thus, the rotating electrical machine MG generates electric power by rotating in the positive direction while outputting regenerative torque in the negative direction.

3-3. Lockup Clutch Control Unit

The lockup clutch control unit 44 is a function unit that controls the lockup clutch LC. The lockup clutch control unit 44 determines whether to engage or disengage the lockup clutch LC, based on the vehicle speed, the accelerator operation amount, the shift position, and the like. The lockup clutch control unit 44 controls engagement or disengagement of the lockup clutch LC by controlling the oil pressure that is supplied to the lockup clutch LC via the hydraulic control device PC. In the present embodiment, during regeneration such as in the case where the required input torque is negative torque, the lockup clutch control unit 44 controls the lockup clutch LC to an engaged state as much as possible in order to increase the torque transfer efficiency and to increase the electric power generation efficiency. On the other hand, if the required input torque is positive torque, the lockup clutch control unit 44 controls the lockup clutch LC to a slipping state when performing a downshift, and controls the lockup clutch LC to an engaged state when performing an upshift, in order to reduce torque shock, or the like. The control of the engagement pressure of the lockup clutch LC during the shift operation will be described in detail later.

3-4. Transmission Clutch Control Unit

The transmission clutch control unit 45 is a function unit that controls the transmission clutch EC. The transmission control unit 45 controls engagement or disengagement of the transmission clutch EC by controlling the oil pressure that is supplied to the transmission clutch EC via the hydraulic control device PC. In the present embodiment, the transmission clutch control unit 45 controls the transmission clutch EC to a disengaged state in the case where the required input torque is small, such as the case where the required input torque is negative torque.

3-5. Speed Change Mechanism Control Unit

The speed change mechanism control unit 46 is a function unit that controls the speed change mechanism TM. The speed change mechanism control unit 46 determines a target gear-shift stage in the speed change mechanism TM, based on the sensor detection information such as the vehicle speed, the accelerator operation amount, and the shift position. The speed change mechanism control unit 46 controls the oil pressure that is supplied to each friction engagement element of the speed change mechanism TM via the hydraulic control device PC, thereby engaging or disengaging each friction engagement element, and thus forming the target gear-shift stage in the speed change mechanism TM.

The speed change mechanism control unit 46 determines the target gear-shift stage by referring to a shift map stored in a memory. The shift map is a map that defines the relation between the accelerator operation amount and the vehicle speed, and the target gear-shift stage in the speed change mechanism TM. A plurality of upshift lines and a plurality of downshift lines are defined on the shift map. If the vehicle speed and the accelerator operation amount change to cross the upshift line or the downshift line on the shift map, the speed change mechanism control unit 46 determines a new target gear-shift stage in the speed change mechanism TM. The target gear-shift stage can also be changed when the shift position is changed. For example, the target gear-shift stage can also be changed when it is detected that the shift position is shifted to the second range or the low range.

The speed change mechanism control unit 46 switches the gear-shift stage in the speed change mechanism TM by controlling the oil pressure that is supplied to the plurality of friction engagement elements C1, B1, . . . according to the new target gear-shift stage. At this time, the speed change mechanism control unit 46 disengages the disengagement-side element and engages the engagement-side element. For example, when performing a downshift, the speed change mechanism control unit 46 performs downshift control of disengaging the disengagement-side element that is one of the friction engagement elements forming a higher gear-shift stage, and engaging the engagement-side element that is one of the friction engagement elements forming a lower gear-shift stage. On the other hand, when performing an upshift, the speed change mechanism control unit 46 performs upshift control of disengaging the disengagement-side element that is one of the friction engagement elements forming a lower gear-shift stage, and engaging the engagement-side element that is one of the friction engagement elements forming a higher gear-shift stage.

Figure 3:
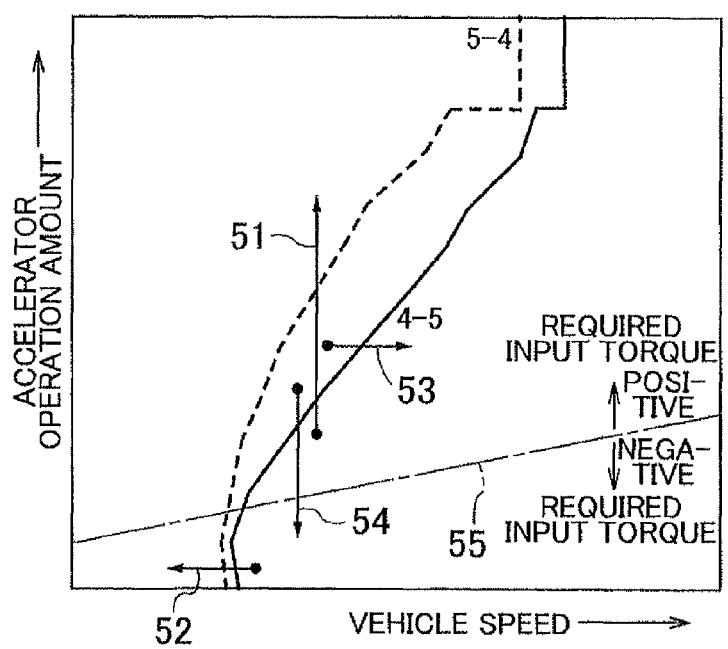
FIG. 3 is a graph illustrating shift patterns according to the embodiment of the present invention.

FIG. 3 shows an example of an upshift line (solid line) and a downshift line (broken line) between the fourth and fifth speeds, as an example of the upshift lines and the downshift lines. The speed change mechanism control unit 46 changes the target gear-shift stage when the vehicle speed and the accelerator operation amount change to cross the upshift line or the downshift line on the shift map as shown in FIG. 3. For example, as shown by arrows 51, 52 in FIG. 3, if the vehicle speed decreases or the accelerator operation amount increases to cross the downshift line from the fifth speed to the fourth speed from the lower right side to the upper left side, the speed change mechanism control unit 46 changes the target gear-shift stage from the fifth speed to the fourth speed. Note that if the vehicle speed increases or the accelerator operation amount decreases to cross the downshift line from the upper left side to the lower right side in FIG. 3, the speed change mechanism control unit 46 does not change the target gear-shift stage. On the other hand, as shown by arrows 53, 54 in FIG. 3, if the vehicle speed increases or the accelerator operation amount decreases to cross the upshift line from the fourth speed to the fifth speed from the upper left side to the lower right side, the speed change mechanism control unit 46 changes the target gear-shift stage from the fourth speed to the fifth speed. Note that if the vehicle speed decreases or the accelerator operation amount increases to cross the upshift line from the lower right side to the upper left side in FIG. 3, the speed change mechanism control unit 46 does not change the target gear-shift stage.

FIG. 3 also shows a line 55 (a zero required input torque line) where the required input torque is zero, as an example of the case where the required input torque is calculated based on the accelerator operation amount and the vehicle speed. The required input torque is positive on the increasing side (the upper side in FIG. 3) of the accelerator operation amount from the zero required input torque line 55. The required input torque is negative on the decreasing side (the lower side in FIG. 3) of the accelerator operation amount from the zero required input torque line 55.

The pattern shown by arrow 51 represents an example in which a downshift is performed in the state in which the required input torque is set to a positive torque (power-on downshift). The pattern shown by arrow 52 represents an example in which a downshift is performed in the state in which the required input torque is set to a negative torque (power-off downshift). The pattern shown by arrow 53 represents an example in which an upshift is performed in the state in which the required input torque is set to a positive torque (power-on upshift). The pattern shown by arrow 54 represents an example in which an upshift is performed in the state in which the required input torque is set to a negative torque (power-off upshift). Examples in which these shift patterns are formed from the state in which the lockup clutch LC is engaged will be described in the following embodiment, 3-6. Lockup Cooperative Shift Control Unit When performing a downshift or upshift in the speed change mechanism TM in the lockup clutch engaged state, namely the state in which the engagement pressure of the lockup clutch LC is equal to or higher than the direct coupling limit engagement pressure, the lockup cooperative shift control unit 41 as a subordinate function unit of the speed change mechanism control unit 46 performs lockup cooperative shift control of performing the downshift or upshift cooperatively with the control of engaging and disengaging the lockup clutch LC. The required input torque is the torque that is required to be transferred from the engine E and the rotating electrical machine MG as the driving force sources of the vehicle to the input shaft I. In the state in which the transmission clutch EC is engaged, the required input torque corresponds to a command value of the torque that is transferred from both the engine E and the rotating electrical machine MG to the input shaft I. In the state in which the transmission clutch EC is disengaged, the required input torque corresponds to a command value of the torque that is transferred only from the rotating electrical machine MG to the input shaft I. The torque that is actually transferred to the input shaft I according to the command value is referred to as input torque. In the present embodiment, if the required input torque is set to a negative torque, the rotating electrical machine MG is controlled to output regenerative torque. The direct coupling limit engagement pressure is an engagement pressure at which the lockup clutch LC starts to slip. The direct coupling limit engagement pressure can also be referred to the minimum engagement pressure at which the lockup clutch LC can transfer the entire input torque to the intermediate shaft M.

When performing a downshift in the lockup clutch engaged state and in the state in which the required input torque is set to a positive torque (power-on downshift), the lockup cooperative shift control unit 41 performs lockup cooperative shift control to control the engagement pressure of the lockup clutch LC to a pressure less than the direct coupling limit engagement pressure during the downshift.

When performing a downshift in the lockup clutch engaged state and in the state in which the required input torque is set to a negative torque (power-off downshift), or performing an upshift regardless of the required input torque (power-on upshift or power-off upshift), the lockup cooperative shift control unit 41 performs lockup cooperative shift control to control the engagement pressure of the lockup clutch LC to a pressure equal to or higher than the direct coupling limit engagement pressure during the downshift or the upshift.

Figure 8:
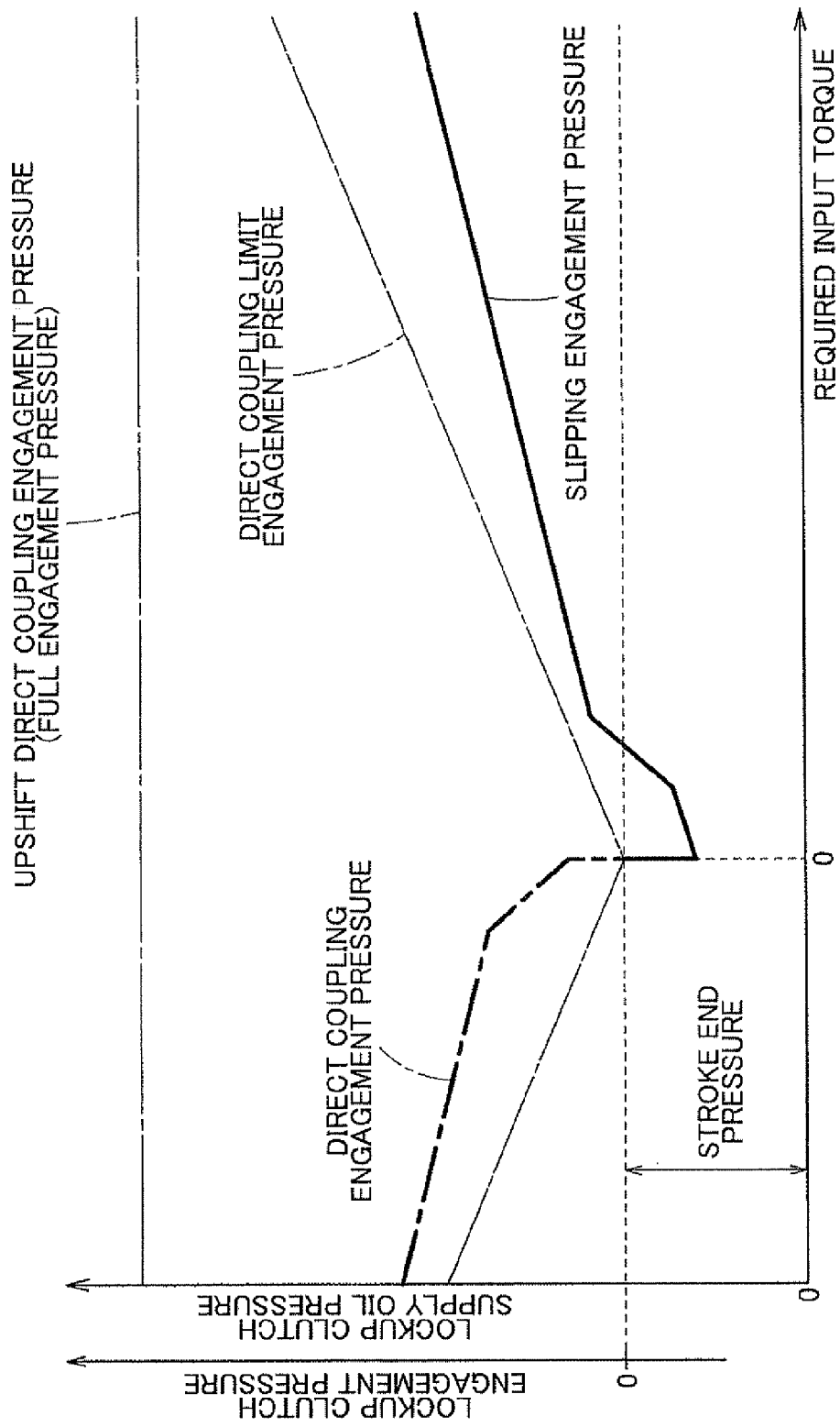
FIG. 8 is a diagram illustrating setting of the engagement pressure of a direct coupling clutch according to the embodiment of the present invention.

The direct coupling limit engagement pressure, which is an engagement pressure at which the lockup clutch LC starts to slip, will be described below. As shown in FIG. 8, the direct coupling limit engagement pressure increases as an absolute value of the required input torque increases, regardless of whether the required input torque is positive or negative.

The direct coupling limit engagement pressure is an engagement pressure of the case where the magnitude of the torque transfer capacity of the lockup clutch LC is equal to that of the required input torque. Thus, if the engagement pressure of the lockup clutch LC is less than the direct coupling limit engagement pressure, the magnitude of the maximum torque capacity of the lockup clutch LC is less than the magnitude of the required input torque, and the lockup clutch LC cannot transfer the entire input torque to the wheel side. In this state, the part of the input torque which is not transferred to the wheel sides serves as excess torque, and the excess torque acts only on the input shaft I, whereby a rotational speed difference (slipping) between the rotational speed of the input shaft I and that of the intermediate shaft M on the wheel side starts to occur.

The direct coupling limit engagement pressure is in proportion to the absolute value of the required input torque. Note that although the engagement pressure of the lockup clutch LC and the oil pressure that is supplied to the lockup clutch LC are shown as two ordinates in FIG. 8, the zero points of the two ordinates are offset from each other substantially by an amount corresponding to the stroke end pressure. That is, the supply oil pressure is larger than the engagement pressure by the amount corresponding to the stroke end pressure.

When performing a downshift in the state in which the required input torque is set to a positive torque (power-on downshift), the speed change mechanism control unit 46 controls the engagement pressure of the lockup clutch LC to a slipping engagement pressure at which slipping occurs, during the downshift. The slipping engagement pressure is set to a larger pressure as the absolute value of the required input torque increases.

In the present embodiment, as shown in the example of FIG. 8, the slipping engagement pressure is set to a pressure lower than a direct coupling engagement pressure on the side where the required input torque is set to a positive torque, and is set to a larger pressure as the absolute value of the required input torque increases. Thus, the lockup clutch LC is controlled to the state in which slipping occurs, and the torque that is transferred by the lockup clutch LC is controlled to increase in proportion to the magnitude of the required input torque.

When performing a downshift in the state in which the required input torque is set to a negative torque (power-off downshift), the speed change mechanism control unit 46 controls the engagement pressure of the lockup clutch LC to the direct coupling engagement pressure that is equal to or higher than the direct coupling limit engagement pressure, during the downshift. The direct coupling engagement pressure is set to a larger pressure as the absolute value of the required input torque increases.

In the present embodiment, as shown in the example of FIG. 8, the direct coupling engagement pressure is set to a pressure higher than the direct coupling limit engagement pressure on the side where the required input torque is set to a negative torque, and is set to a larger pressure as the absolute value of the required input torque increases.

Thus, the lockup clutch LC is controlled to the state in which no slipping occurs, and is controlled to the state in which the lockup clutch LC is capable of transferring all the required input torque. The direct coupling engagement pressure is set to such a pressure that is lower than a full engagement pressure described later and is close to the direct coupling limit engagement pressure. By thus setting the direct coupling engagement pressure to a pressure close to the direct coupling limit engagement pressure, the engagement pressure of the lockup clutch LC can be changed to the slipping engagement pressure without delay during the downshift, even if the required input torque changes from negative to positive during the downshift.

When performing an upshift (power-on upshift or power-off upshift), the speed change mechanism control unit 46 controls the engagement pressure of the lockup clutch LC to an upshift direct coupling engagement pressure that is equal to or higher than the direct coupling limit engagement pressure, during the upshift regardless of the required input torque. The upshift direct coupling engagement pressure is set to the full engagement pressure regardless of the magnitude of the required input torque. The full engagement pressure is an engagement pressure at which the direct coupling clutch does not slip even at the maximum required input torque. In the present embodiment, as shown in the example of FIG. 8, the upshift direct coupling engagement pressure is set to a pressure that is substantially constant even if the absolute value of the required input torque changes, and is set to a pressure corresponding to the maximum torque capacity larger than the maximum value of the required input torque.

The lockup cooperative shift control that is performed for each shift pattern by the lockup cooperative shift control unit 41 will be described in detail below with reference to FIGS. 4 to 7.

3-6-1. Power-On Downshift

First, the lockup cooperative shift control that is performed by the lockup cooperative shift control unit 41 when performing a power-on downshift from the lockup clutch engaged state will be described with reference to FIG. 4. In this control, the engagement pressure of the lockup clutch LC is controlled to a pressure lower than the direct coupling limit engagement pressure during the downshift. The power-on downshift is the downshift control that is performed in the state in which the required input torque is set to a positive torque.

3-6-1-1. Pre-Control Phase

Figure 4:
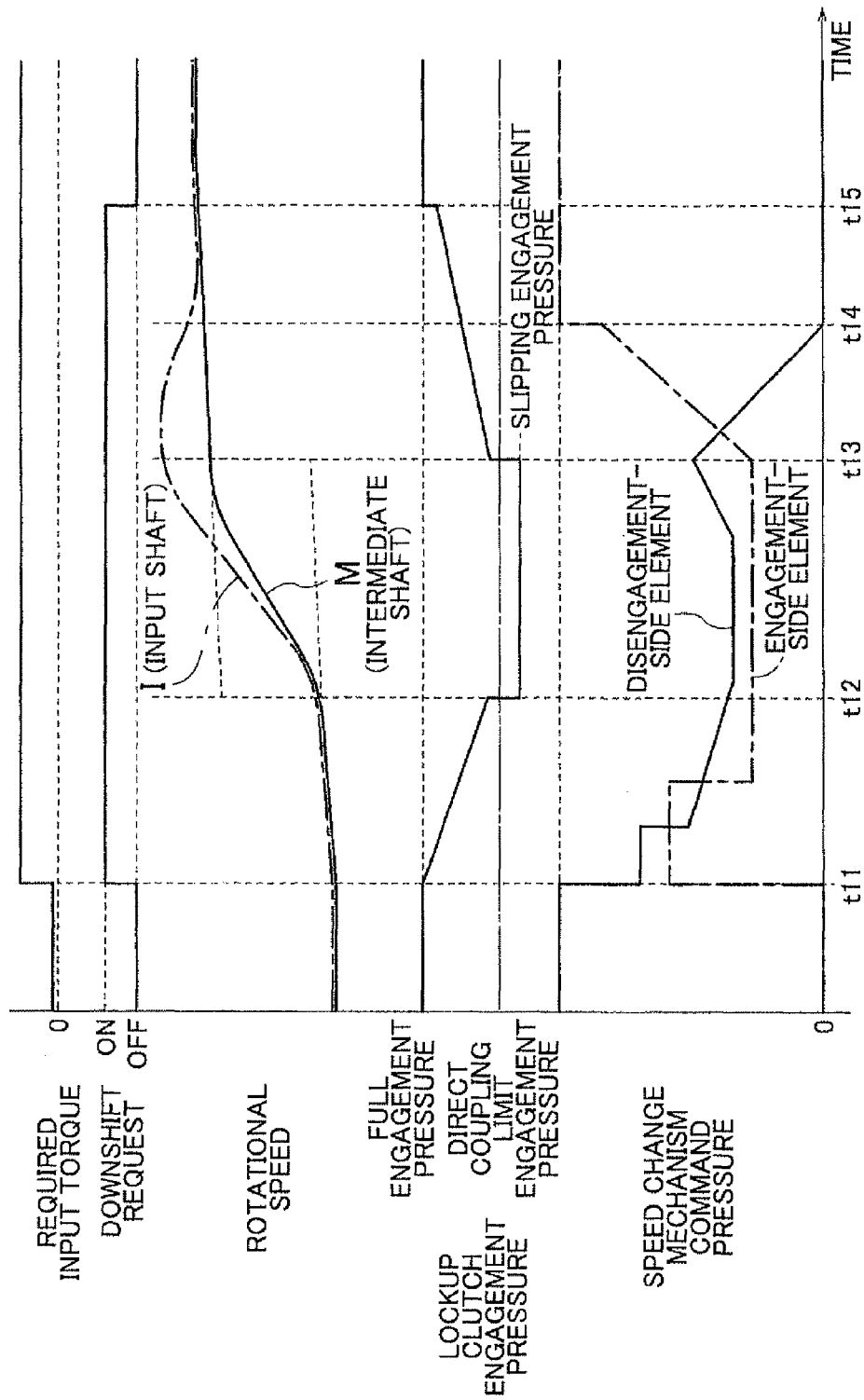
FIG. 4 is a timing chart illustrating processing of the control device according to the embodiment of the present invention.

The lockup cooperative shift control unit 41 starts the lockup cooperative shift control in the power-on downshift (at time t11 or later in FIG. 4) if there is a downshift request (at time t11 in FIG. 4), such as the accelerator operation amount increasing to cross the downshift line as shown in the example of arrow 51 in FIG. 3, in the lockup clutch engaged state in which the engagement pressure of the lockup clutch LC is equal to or higher than the direct coupling limit engagement pressure (up to time t11 in FIG. 4). The engagement pressure of the lockup clutch LC is controlled to the full engagement pressure until the lockup cooperative shift control is started (until time t11 in FIG. 4).

In this case, in the present embodiment, the lockup cooperative shift control unit 41 shifts the control phase from a normal control phase to a pre-control phase (at time t11 in FIG. 4). The pre-control phase is a phase in which the engagement pressure of the disengagement-side element and the engagement-side element of the speed change mechanism TM or the engagement pressure of the lockup clutch LC is changed in advance.

In the present embodiment, after shifting to the pre-control phase (at time t11), the lockup cooperative shift control unit 41 gradually reduces the engagement pressure of the lockup clutch LC from the full engagement pressure to a predetermined pressure higher than the direct coupling limit engagement pressure. The lockup cooperative shift control unit 41 starts to control the oil pressure that is supplied to the engagement-side element to a predetermined engagement-side preliminary pressure in order to start generating the torque transfer capacity in the engagement-side element of the speed change mechanism TM. In this example, the engagement-side preliminary pressure is set to a pressure that is lower than the stroke end pressure by a predetermined pressure. As shown in the example of FIG. 4, after starting the control of the engagement-side preliminary pressure, the lockup cooperative shift control unit 41 instantaneously sets a command pressure higher than the engagement-side preliminary pressure to facilitate rising of an actual pressure.

After shifting to the pre-control phase, the lockup cooperative shift control unit 41 reduces the oil pressure being supplied to the disengagement-side element of the speed change mechanism TM, from the full engagement pressure to a disengagement-side preliminary pressure that is set according to the input torque that is transferred to the intermediate shaft M. The disengagement-side preliminary pressure is set to a pressure that is higher than a direct coupling limit pressure by a predetermined pressure. The direct coupling limit pressure is the minimum oil pressure at which the disengagement-side element can transfer to the wheel side the entire input torque transferred to the intermediate shaft M. The full engagement pressure is an oil pressure at which the friction engage element does not slip even when the required input torque is increased to the maximum value of the total output torque of the engine E and the rotating electrical machine MG as the driving force sources. After a predetermined time period has elapsed following the reduction of the command pressure to the disengagement-side preliminary pressure, the lockup cooperative shift control unit 41 further reduces the command pressure by a predetermined oil pressure in a stepwise fashion, and then gradually reduces the command pressure toward the direct coupling limit pressure. The input torque that is transferred to the intermediate shaft M is input torque that is transferred to the intermediate shaft M according to the required input torque.

The lockup cooperative shift control unit 41 converts the engagement pressure of the lockup clutch LC to the command pressure of the supply oil pressure. The lockup cooperative shift control unit 41 sends the command pressure for the lockup clutch LC, the engagement-side element, and the disengagement-side element to the hydraulic control device PC, and the hydraulic control device PC supplies hydraulic oil having the command pressure to the lockup clutch LC, the engagement-side element, and the disengagement-side element. The lockup cooperative shift control unit 41 supplies the hydraulic oil having the command pressure to each friction engagement element via the hydraulic control device PC, even if not specifically mentioned. Note that although the lockup cooperative shift control unit 41 is structured to set the engagement pressure for the lockup clutch LC, the lockup cooperative shift control unit 41 may set the supply oil pressure. Although the lockup cooperative shift control unit 41 is structured to set the supply oil pressure for the engagement-side element and the disengagement-side element, the lockup cooperative shift control unit 41 may set the engagement pressure.

3-6-1-2. Inertia Control Phase

The lockup cooperative shift control unit 41 shifts the control phase from the pre-control phase to an inertia control phase when the rotational speed of the intermediate shaft M starts to vary from the target rotational speed of a higher gear-shift stage (at time t12 in FIG. 4). The target rotational speed of the intermediate shaft M at each gear-shift stage is set to the rotational speed of the output shaft O multiplied by the speed ratio of each gear-shift stage.

In the inertia control phase, the relation of the rotational speed is shifted from the state of a higher gear-shift stage to the state of a lower gear-shift stage, whereas the relation of the torque does not change and is maintained in the state of the higher gear-shift stage. The disengagement-side element is brought into a state in which the disengagement-side element transfers torque while slipping, and the engagement-side element is brought into a disengaged state. That is, in the inertia control phase, the relation of the torque transfer does not change from the relation of the higher gear-shift stage, and only the relation of the rotational speed is shifted from the relation of the higher gear-shift stage to the relation of the lower gear-shift stage.

As the supply oil pressure of the disengagement-side element gradually decreases and becomes lower than the direct coupling limit pressure, the disengagement-side element can no longer transfer to the wheel side the entire input torque that is transferred to the intermediate shaft M. In this state, the part of the input torque which is not transferred to the wheel side serves as excess torque, and the excess torque acts only on the input member side of the disengagement-side element, whereby the rotational speed difference (slipping) between the rotational speed of the input member of the disengagement-side element and that of the output member of the disengagement-side element starts to occur. In the case where the required input torque is positive as in the power-on downshift, the excess torque is positive, and the rotational speed on the input member side of the disengagement-side element exceeds that on the output member side of the disengagement-side element, whereby the disengagement-side element starts to slip. Thus, the rotational speed of the intermediate shaft M starts to exceed the target rotational speed of the higher gear-shift stage. The lockup cooperative shift control unit 41 detects the variation of the rotational speed of the intermediate shaft M from the target rotational speed of the higher gear-shift stage, and shifts the control phase from the pre-control phase to the inertia control phase. Alternatively, the lockup cooperative shift control unit 41 may shift the control phase from the pre-control phase to the inertia control phase after a predetermined time period has elapsed following the start of the pre-control phase.

In the inertia control phase, the excess torque, which is the torque that is not transferred to the wheel side out of the input torque transferred to the intermediate shaft M, is controlled by controlling the supply oil pressure of the disengagement-side element to a pressure lower than the direct coupling limit pressure, and the rotational speed of the intermediate shaft M is increased to the target rotational speed of the lower gear-shift stage by using the excess torque. The rate at which the rotational speed of the intermediate shaft M increases is in proportion to the magnitude of the excess torque, and is in inverse proportion to the inertia (the moment of inertia) on the input member side.

In the power-on downshift, the required input torque is often set to a large torque, and the shift operation is required to be performed in a short time. In such a power-on downshift, it is important to perform the shift operation in a short time while reducing torque shock. Thus, in the present embodiment, the lockup clutch LC is temporarily caused to slip during the shift operation in order to reduce the torque shock and the shift time. In the power-on downshift, the rotating electrical machine MG does not perform regeneration by using the rotation driving force that is transmitted from the wheels W, and in this example, the output torque of the rotating electrical machine MG is not set to regenerative torque. Thus, the lockup clutch LC does not need to be maintained in an engaged state without slipping in order to increase the regeneration efficiency.

When shifting to the inertia control phase (at time t12 in FIG. 4), the lockup cooperative shift control unit 41 reduces the engagement pressure of the lockup clutch LC to a pressure lower than the direct coupling limit engagement pressure.

When the engagement pressure of the lockup clutch LC becomes lower than the direct coupling limit engagement pressure (at time t12 in FIG. 4), the part of the input torque which is not transferred to the intermediate shaft M serves as excess torque, and the rotational speed of the input shaft I starts to exceed the rotational speed of the intermediate shaft M, as shown in FIG. 4.

If slipping of the lockup clutch LC is caused by reducing the torque transfer capacity thereof, the inertia on the input member side of the lockup clutch LC is separated from the inertia on the output member side thereof, and the inertia that acts on the intermediate shaft M decreases by an amount corresponding to the inertia on the input member side such as the rotating electrical machine MG and the engine E.

Thus, causing the slipping of the lockup clutch L can reduce the inertia that acts on the intermediate shaft M, and can increase the rate at which the rotational speed of the intermediate shaft M. Moreover, by reducing the inertia that acts on the intermediate shaft M, the rotational speed of the intermediate shaft M can be controlled with high responsiveness without significantly changing the excess torque by the hydraulic control of the disengagement-side element. This can prevent reduction in control accuracy of the rotational speed of the intermediate shaft M due to the response delay of the hydraulic control of the disengagement-side element, whereby the control accuracy can be increased. Since the response delay of the hydraulic control is relatively long, the control accuracy is further increased.

As shown in FIG. 8, the lockup cooperative shift control unit 41 sets the sliding engagement pressure, which is a pressure at which sliding occurs, to a higher pressure as the absolute value of the required input torque increases. Thus, even during the downshift, the torque that is transferred to the intermediate shaft M and the speed change mechanism TM via the lockup clutch LC can be appropriately increased according to an increase in required input torque, whereby the possibility can be reduced that the torque that is transferred to the wheel side during the downshift may significantly decrease from the required input torque. As the required input torque increases, the excess torque can be appropriately increased, whereby the time for reengaging the lockup clutch after the shift operation can be reduced.

As the rotational speed of the intermediate shaft M gets closer to the target rotational speed of the lower gear-shift stage, the lockup cooperative shift control unit 41 increases the supply oil pressure of the disengagement-side element, and increases the torque transfer capacity of the disengagement-side element to increase the transferred torque, thereby reducing the excess torque and the rate at which the rotational speed of the intermediate shaft M increases. Then, the rotational speed of the intermediate shaft M is synchronized with the target rotational speed of the lower gear-shift stage. In the present embodiment, the supply oil pressure of the disengagement-side element is increased as the rotational speed of the intermediate shaft M gets closer to the target rotational speed of the lower gear-shift stage, so that the rate at which the rotational speed of the intermediate shaft M increases at the time when the rotational speed of the intermediate shaft M reaches the target rotational speed of the lower gear-shift stage matches the rate at which the target rotational speed of the lower gear-shift stage increases. The supply oil pressure of the disengagement-side element is changed in this manner by one or both of feedback control and feed forward control based on the rotational speed of the intermediate shaft M and the target rotational speed of the lower gear-shift stage.

3-6-1-3. Torque Control Phase

The lockup cooperative shift control unit 41 shifts the control phase from the inertia control phase to a torque control phase when it is determined that the rotational speed of the intermediate shaft M has been synchronized with the target rotational speed of the lower gear-shift stage (at time t13 in FIG. 4).

In the torque control phase, the relation of the torque is also shifted from the state of the higher gear-shift stage to the state of the lower gear-shift stage, and the torque sharing is completely shifted from the disengagement-side element to the engagement-side element. That is, in the torque control phase, not only the relation of the rotational speed but also the relation of the torque transfer are shifted from the state of the higher gear-shift stage to the state of the lower gear-shift stage.

The lockup cooperative shift control unit 41 gradually increases the supply oil pressure of the engagement-side element from the engagement-side preliminary pressure after shifting to the torque control phase, and increases the supply oil pressure of the engagement-side element to the full engagement pressure after a predetermined time period has elapsed following the shift to the torque control phase (at time t14 in FIG. 4). On the other hand, the lockup cooperative shift control unit 41 gradually reduces the supply oil pressure of the disengagement-side element to zero after shifting to the torque control phase.

After shifting to the torque control phase, the lockup cooperative shift control unit 41 gradually increases the engagement pressure of the lockup clutch LC from the slipping engagement pressure to the full engagement pressure to reduce slipping of the lockup clutch LC.

In the present embodiment, after shifting to the torque control phase (at time t13 in FIG. 4), the lockup cooperative shift control unit 41 increases the engagement pressure of the lockup clutch LC to a pressure that is higher than the direct coupling limit engagement pressure by a predetermined pressure. Then, the lockup cooperative shift control unit 41 gradually increases the engagement pressure of the lockup clutch LC to the full engagement pressure.

When the engagement pressure of the lockup clutch LC exceeds the direct coupling limit engagement pressure, the transferred torque that is transferred from the input member (the input shaft I side) to the output member (the intermediate shaft M side) of the lockup clutch LC exceeds the required input torque, and the magnitude of negative torque that is applied from the lockup clutch LC to the input shaft I as the reaction force of the transferred torque exceeds the magnitude of the required input torque. Thus, after shifting to the torque control phase, the rotational speed of the input shaft I starts to decrease, and slipping of the lockup clutch LC starts to decrease. A response delay is caused by the inertia by the time the slipping of the lockup clutch LC is eliminated after the slipping starts to decrease. This is because the rate at which the rotational speed of the input shaft I decreases is in inverse proportion to the inertia on the input shaft I side, and the rotational speed of the input shaft I does not immediately decrease to that of the intermediate shaft M.

The lockup cooperative shift control unit 41 increases the lockup engagement pressure to the full engagement pressure after a predetermined time period has elapsed (at time t15 in FIG. 4) following the shift to the torque control phase. Thus, the lockup clutch LC is restored to the engaged state, which is the state before the power-on downshift is started. The lockup cooperative shift control unit 41 thus completes the lockup cooperative shift control in the power-on downshift. Alternatively, the lockup cooperative shift control unit 41 may increase the lockup engagement pressure to the full engagement pressure when it is determined that the rotational speed of the input shaft I matches that of the intermediate shaft M.

3-6-2. Power-Off Downshift

The lockup cooperative shift control that is performed by the lockup cooperative shift control unit 41 when performing a power-on downshift from the lockup clutch engaged state will be described below with reference to FIG. 5. In this control, the engagement pressure of the lockup clutch LC is controlled to the direct coupling engagement pressure equal to or higher than the direct coupling limit engagement pressure during the downshift. The power-on downshift is the downshift control that is performed in the state in which the required input torque is set to a negative torque.

3-6-2-1. Pre-Control Phase

Figure 5:
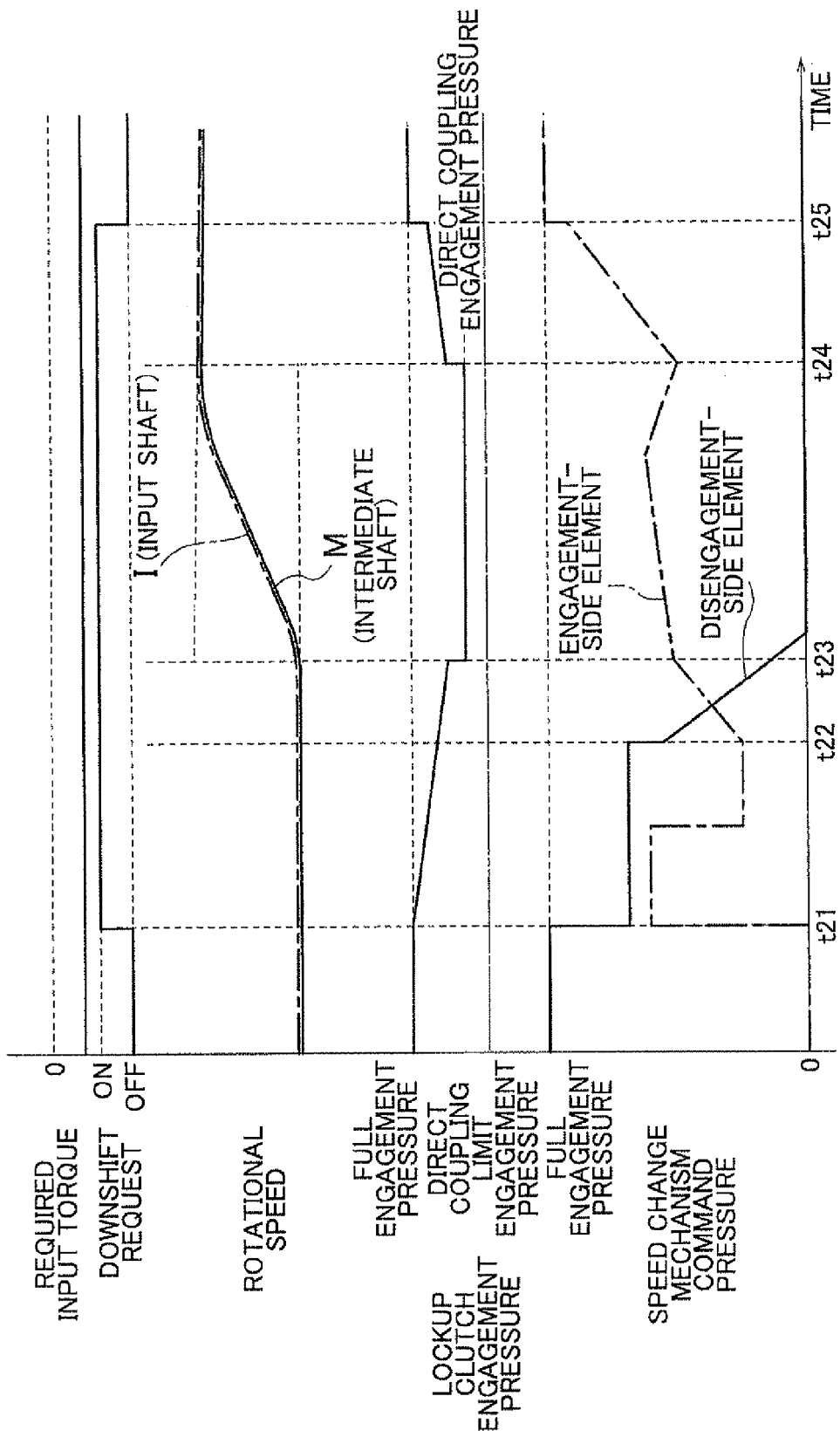
FIG. 5 is a timing chart illustrating processing of the control device according to the embodiment of the present invention.

The lockup cooperative shift control unit 41 starts the lockup cooperative shift control in the power-off downshift (at time t21 or later in FIG. 5) if there is a downshift request (at time t21 in FIG. 5), such as the vehicle speed decreasing to cross the downshift line as shown in the example of arrow 52 in FIG. 3, in the lockup clutch engaged state in which the engagement pressure of the lockup clutch LC is equal to or higher than the direct coupling limit engagement pressure (up to time t21 in FIG. 5). The rotating electrical machine MG outputs regenerative torque during the lockup cooperative shift control since the required input torque is negative. The engagement pressure of the lockup clutch LC is controlled to the full engagement pressure until the lockup cooperative shift control is started (until time t21 in FIG. 5).

In this case, in the present embodiment, the lockup cooperative shift control unit 41 shifts the control phase from a normal control phase to a pre-control phase (at time t21 in FIG. 5).

In the present embodiment, after shifting to the pre-control phase (at time t21), the lockup cooperative shift control unit 41 gradually reduces the engagement pressure of the lockup clutch LC from the full engagement pressure to the direct coupling engagement pressure. The lockup cooperative shift control unit 41 starts to control the oil pressure that is supplied to the engagement-side element to a predetermined engagement-side preliminary pressure in order to start generating the torque transfer capacity in the engagement-side element of the speed change mechanism TM. In this example, the engagement-side preliminary pressure is set to a pressure that is lower than the stroke end pressure by a predetermined pressure. As shown in the example of FIG. 5, after starting the control of the engagement-side preliminary pressure, the lockup cooperative shift control unit 41 instantaneously sets a command value higher than the engagement-side preliminary pressure to facilitate rising of an actual pressure.

After shifting to the pre-control phase, the lockup cooperative shift control unit 41 reduces the oil pressure being supplied to the disengagement-side element of the speed change mechanism TM, from the full engagement pressure to a disengagement-side preliminary pressure that is set according to the required input torque. The disengagement-side preliminary pressure is set to a pressure that is higher than a direct coupling limit pressure by a predetermined pressure. The direct coupling limit pressure is the minimum oil pressure at which the disengagement-side element can transfer all the required input torque to the wheel side.

3-6-2-2. Torque Control Phase

The lockup cooperative shift control unit 41 shifts the control phase from the pre-control phase to a torque control phase after a predetermined time period has elapsed following the start of the pre-control phase.

In the torque control phase, the relation of the torque is shifted from the state of a higher gear-shift stage to the state of a lower gear-shift stage, whereas the relation of the rotational speed does not change, and the rotational speed in the state of the higher gear-shift stage is maintained. The engagement-side element is brought into a state in which the engagement-side element slips while transferring torque by friction, and the disengagement-side element is brought into a disengaged state. That is, in the torque control phase, the relation of the rotational speed does not change from the relation of the higher gear-shift stage, and only the torque sharing is shifted from the relation of the higher gear-shift stage to the relation of the lower gear-shift stage.

After shifting to the torque control phase (at time t22 in FIG. 5), the lockup cooperative shift control unit 41 gradually increases the supply oil pressure of the engagement-side element from the engagement-side preliminary pressure to the direct coupling limit pressure. On the other hand, after shifting to the torque control phase, the lockup cooperative shift control unit 41 reduces the supply oil pressure of the disengagement-side element by a predetermined pressure from the disengagement-side preliminary pressure in a stepwise fashion, and then gradually reduces the supply oil pressure of the disengagement-side element to zero. In this example, the time when the supply oil pressure of the disengagement-side element reaches the stroke end pressure is set to match the time when the supply oil pressure of the engagement-side element reaches the direct coupling limit pressure.

The lockup cooperative shift control unit 41 continues to gradually reduce the engagement pressure of the lockup clutch LC to the directly coupling engagement pressure as in the pre-control phase, even after shifting to the torque control phase.

3-6-2-3. Inertia Control Phase

The lockup cooperative shift control unit 41 shifts the control phase from the torque control phase to the inertia control phase after the supply oil pressure of the engagement-side element reaches the direct coupling limit pressure (at time t23 in FIG. 5).

In the inertia control phase, the torque that is transferred from the wheel side to the intermediate shaft M by the friction between the input and output members of the engagement-side element is caused to exceed the magnitude of the required input torque by increasing the supply oil pressure of the engagement-side element to a pressure higher than the direct coupling limit pressure. By using the excess torque, namely the amount of torque exceeding the required input torque, the rotational speed on the input member side of the engagement-side element is increased to the rotational speed of the output member side thereof, thereby shifting to the state in which there is no difference in rotational speed (no slipping) between the input and output members of the engagement-side element. The rate at which the rotational speed of the input member side is increased is in proportion to the excess torque, and is in inverse proportion to the inertia (the moment of inertia) on the input member side.

After shifting to the inertia control phase (at time t23 in FIG. 5), the lockup cooperative shift control unit 41 gradually increases the supply oil pressure of the engagement-side element from the direct coupling limit pressure. Thus, the excess torque acting on the intermediate shaft M increases, and the rotational speed of the intermediate shaft M increases. As the rotational speed of the intermediate shaft M gets closer to the target rotational speed of the lower gear-shift stage, the lockup cooperative shift control unit 41 reduces the supply oil pressure of the engagement-side element, and reduces the torque transfer capacity of the engagement-side element to reduce the transferred torque, thereby reducing the excess torque and the rate at which the rotational speed of the intermediate shaft M increases. In the present embodiment, the supply oil pressure of the engagement-side element is reduced as the rotational speed of the intermediate shaft M gets closer to the target rotational speed of the lower gear-shift stage, so that the rate at which the rotational speed of the intermediate shaft M increases at the time when the rotational speed of the intermediate shaft M reaches the target rotational speed of the lower gear-shift stage matches the rate at which the target rotational speed of the lower gear-shift stage increases. The supply oil pressure of the engagement-side element is changed in this manner by one or both of feedback control and feed forward control based on the rotational speed of the intermediate shaft M and the target rotational speed of the lower gear-shift stage.

After shifting to the inertia control phase (at time t23 in FIG. 5), the lockup cooperative shift control unit 41 sets the engagement pressure of the lockup clutch LC to the direct coupling engagement pressure. As shown in FIG. 8, the direct coupling engagement pressure is set to a larger pressure as the absolute value of the required input torque increases. Thus, the engagement pressure of the lockup clutch LC can be changed to the slipping engagement pressure without delay during the downshift, even if the required input torque changes from negative to positive during the power-off downshift, and the shift control is shifted to the power-on downshift control. Moreover, generation of torque shock during the power-on downshift can be prevented.

The lockup cooperative shift control unit 41 gradually increases the supply oil pressure of the engagement-side element to the full engagement pressure when it is determined that the rotational speed of the intermediate shaft M has been synchronized with the target rotational speed of the lower gear-shift stage (at time t24 in FIG. 5). At the same time, the lockup cooperative shift control unit 41 gradually increases the engagement pressure of the lockup clutch LC to the full engagement pressure.

After a predetermined time period has elapsed following the determination of the synchronization (at time t25 in FIG. 5), the lockup cooperative shift control unit 41 increases the supply oil pressure of the engagement-side element to the full engagement pressure in a stepwise fashion, and increases the engagement pressure of the lockup clutch LC to the full engagement pressure in a stepwise fashion. The lockup cooperative shift control unit 41 thus completes the lockup cooperative shift control in the power-off downshift.

3-6-3. Power-On Upshift

First, the lockup cooperative shift control that is performed by the lockup cooperative shift control unit 41 when performing a power-on upshift in the lockup clutch engaged state will be described with reference to FIG. 6. In this control, the engagement pressure of the lockup clutch LC is controlled to the upshift direct coupling engagement pressure equal to or higher than the direct coupling limit engagement pressure during the upshift. The power-on upshift is the upshift control that is performed in the state in which the required input torque is set to a positive torque.

Note that as shown in FIG. 8, the upshift direct coupling engagement pressure is set to the full engagement pressure at which the direct coupling clutch does not slip even at the maximum required input torque, regardless of the magnitude of the required input torque.

3-6-3-1. Pre-Control Phase

Figure 6:
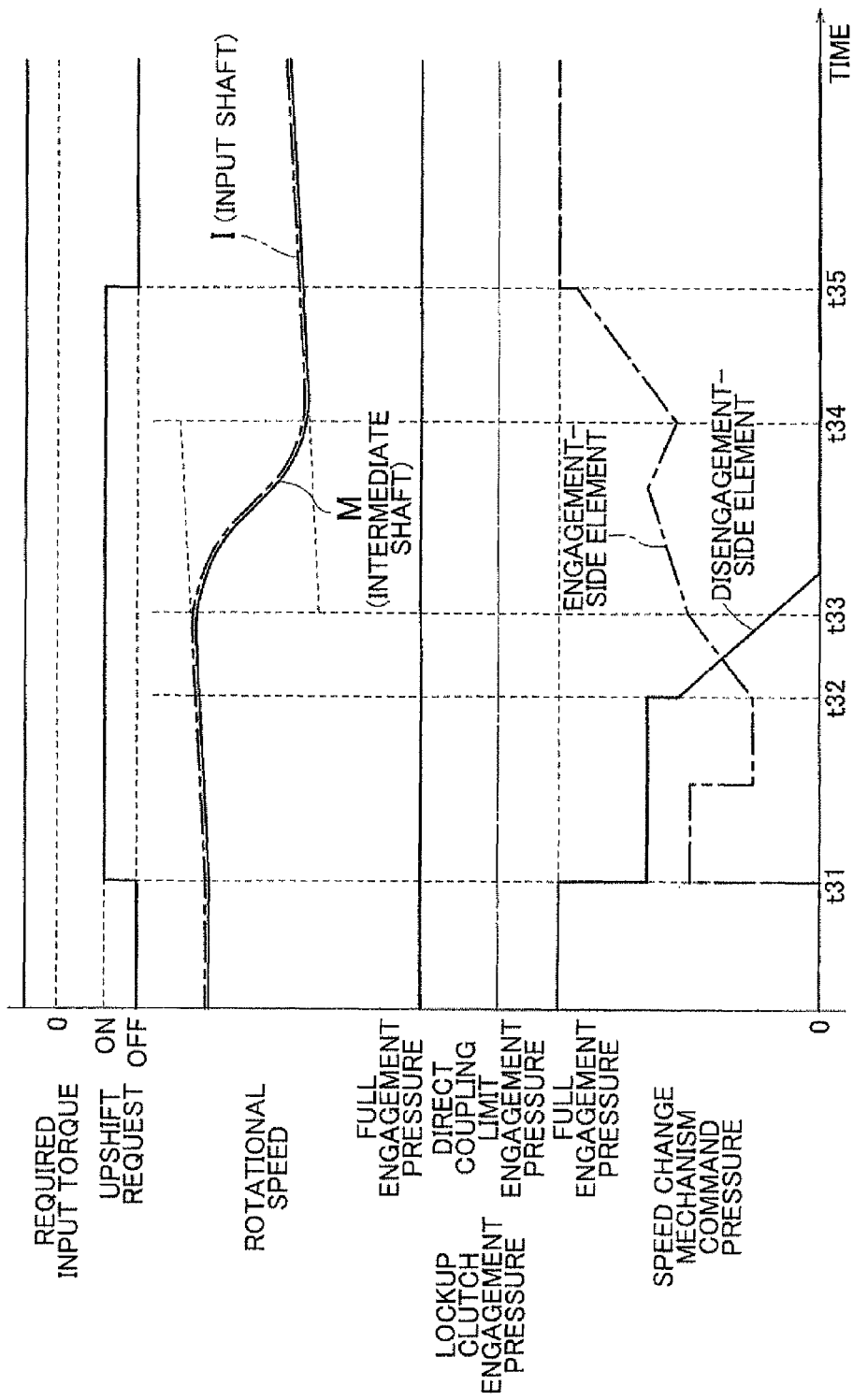
FIG. 6 is a timing chart illustrating processing of the control device according to the embodiment of the present invention.

The lockup cooperative shift control unit 41 starts the lockup cooperative shift control in the power-on upshift (at time t31 or later in FIG. 6) if there is an upshift request (at time t31 in FIG. 6), such as the vehicle speed increasing to cross the upshift line as shown in the example of arrow 53 in FIG. 3, in the lockup clutch engaged state in which the engagement pressure of the lockup clutch LC is equal to or higher than the direct coupling limit engagement pressure (up to time t31 in FIG. 6). Note that the engagement pressure of the lockup clutch LC is controlled to the full engagement pressure until the lockup cooperative shift control is started (until time t31 in FIG. 6).

In the present embodiment, in this case, the lockup cooperative shift control unit 41 shifts the control phase from a normal control phase to a pre-control phase (at time t31 in FIG. 6).

In the present embodiment, even after shifting to the pre-control phase (at time t31), the lockup cooperative shift control unit 41 maintains the engagement pressure of the lockup clutch LC at the full engagement pressure. The lockup cooperative shift control unit 41 starts to control the oil pressure that is supplied to the engagement-side element to a predetermined engagement-side preliminary pressure in order to start generating the torque transfer capacity in the engagement-side element of the speed change mechanism TM. In this example, the engagement-side preliminary pressure is set to a pressure that is lower than the stroke end pressure by a predetermined pressure. As shown in the example of FIG. 6, after starting the control of the engagement-side preliminary pressure, the lockup cooperative shift control unit 41 instantaneously sets a command value higher than the engagement-side preliminary pressure to facilitate rising of an actual pressure.

After shifting to the pre-control phase, the lockup cooperative shift control unit 41 reduces the oil pressure being supplied to the disengagement-side element of the speed change mechanism TM, from the full engagement pressure to a disengagement-side preliminary pressure that is set according to the required input torque. The disengagement-side preliminary pressure is set to a pressure that is higher than a direct coupling limit pressure by a predetermined pressure. The direct coupling limit pressure is the minimum oil pressure at which the disengagement-side element can transfer all the required input torque to the wheel side.

3-6-3-2. Torque Control Phase

The lockup cooperative shift control unit 41 shifts the control phase from the pre-control phase to a torque control phase after a predetermined time period has elapsed following the start of the pre-control phase.

In the torque control phase, the relation of the torque is shifted from the state of the lower gear-shift stage to the state of the higher gear-shift stage, whereas the relation of the rotational speed does not change, and the rotational speed in the state of the lower gear-shift stage is maintained. The engagement-side element is brought into a state in which the engagement-side element slips while transferring torque by friction, and the disengagement-side element is brought into a disengaged state. That is, in the torque control phase, the relation of the rotational speed does not change from the relation of the lower gear-shift stage, and only the torque sharing is shifted from the relation of the lower gear-shift stage to the relation of the higher gear-shift stage.

After shifting to the torque control phase (at time t32 in FIG. 6), the lockup cooperative shift control unit 41 gradually increases the supply oil pressure of the engagement-side element from the engagement-side preliminary pressure to the direct coupling limit pressure. On the other hand, after shifting to the torque control phase, the lockup cooperative shift control unit 41 reduces the supply oil pressure of the disengagement-side element by a predetermined pressure from the disengagement-side preliminary pressure in a stepwise fashion, and then gradually reduces the supply oil pressure of the disengagement-side element to zero. In this example, the time when the supply oil pressure of the disengagement-side element reaches the stroke end pressure is set to match the time when the supply oil pressure of the engagement-side element reaches the direct coupling limit pressure.

In the present embodiment, the lockup cooperative shift control unit 41 maintains the engagement pressure of the lockup clutch LC at the full engagement pressure even after shifting to the torque control phase (at time t32).

3-6-3-3. Inertia Control Phase

The lockup cooperative shift control unit 41 shifts the control phase from the torque control phase to the inertia control phase after the supply oil pressure of the engagement-side element reaches the direct coupling limit pressure (at time t33 in FIG. 6).

In the inertia control phase, the torque that is transferred from the intermediate shaft M to the wheel side by the friction between the input and output members of the engagement-side element is caused to exceed the magnitude of the required input torque by increasing the supply oil pressure of the engagement-side element to a pressure higher than the direct coupling limit pressure. Since the torque equal to or higher than the required input torque is transferred to the wheel side, the excess torque that acts on the input member side is negative torque. Thus, the rotational speed on the input member side of the engagement-side element is reduced to the rotational speed on the output member side thereof, thereby shifting to the state in which there is no difference in rotational speed (no slipping) between the input and output members of the engagement-side element. The rate at which the rotational speed of the input member side is reduced is in proportion to the excess torque, and is in inverse proportion to the inertia (the moment of inertia) on the input member side.

After shifting to the inertia control phase (at time t33 in FIG. 6), the lockup cooperative shift control unit 41 gradually increases the supply oil pressure of the engagement-side element from the direct coupling limit pressure. Thus, the magnitude of the excess torque as the negative torque acting on the intermediate shaft M increases, and the rate at which the rotational speed of the intermediate shaft M decreases increases. As the rotational speed of the intermediate shaft M gets closer to the target rotational speed of the higher gear-shift stage, the lockup cooperative shift control unit 41 reduces the supply oil pressure of the engagement-side element, and reduces the torque transfer capacity of the engagement-side element to reduce the transferred torque, thereby reducing the magnitude of the excess torque and the rate at which the rotational speed of the intermediate shaft M decreases. In the present embodiment, the supply oil pressure of the engagement-side element is reduced as the rotational speed of the intermediate shaft M gets closer to the target rotational speed of the higher gear-shift stage, so that the rate at which the rotational speed of the intermediate shaft M decreases at the time when the rotational speed of the intermediate shaft M reaches the target rotational speed of the higher gear-shift stage matches the rate at which the target rotational speed of the higher gear-shift stage decreases. The supply oil pressure of the engagement-side element is changed in this manner by one or both of feedback control and feed forward control based on the rotational speed of the intermediate shaft M and the target rotational speed of the higher gear-shift stage.

In the present embodiment, the lockup cooperative shift control unit 41 maintains the engagement pressure of the lockup clutch LC at the full engagement pressure even after shifting to the inertia control phase (at time t33). Thus, regenerative torque can be transferred to the wheel side even during the shift operation, whereby reduction in regeneration efficiency can be prevented. As shown in the example of arrow 53 in FIG. 3, the power-on upshift is not a shift operation that is performed when the required input torque is significantly increased like the power-on downshift. Thus, the need to reduce the shift time is relatively low. Thus, torque shock due to the shift operation is less likely to increase, and it is less necessary to reduce the torque shock by causing slipping of the lockup clutch LC.

The lockup cooperative shift control unit 41 gradually increases the supply oil pressure of the engagement-side element to the full engagement pressure when it is determined that the rotational speed of the intermediate shaft M has been synchronized with the target rotational speed of the higher gear-shift stage (at time t34 in FIG. 6). After a predetermined time period has elapsed following the determination of the synchronization (at time t35 in FIG. 6), the lockup cooperative shift control unit 41 increases the supply oil pressure of the engagement-side element to the full engagement pressure in a stepwise fashion. The lockup cooperative shift control unit 41 thus completes the lockup cooperative shift control in the power-on upshift.

3-6-4. Power-Off Upshift

The lockup cooperative shift control that is performed by the lockup cooperative shift control unit 41 when performing a power-off upshift in the lockup clutch engaged state will be described with reference to FIG. 7. In this control, the engagement pressure of the lockup clutch LC is controlled to the upshift direct coupling engagement pressure equal to or higher than the direct coupling limit engagement pressure during the upshift. The power-off upshift is the upshift control that is performed in the state in which the required input torque is set to a negative torque.

Note that as shown in FIG. 8, the upshift direct coupling engagement pressure is set to the full engagement pressure at which the direct coupling clutch does not slip even at the maximum required input torque, regardless of the magnitude of the required input torque.

3-6-4-1. Pre-Control Phase

Figure 7:
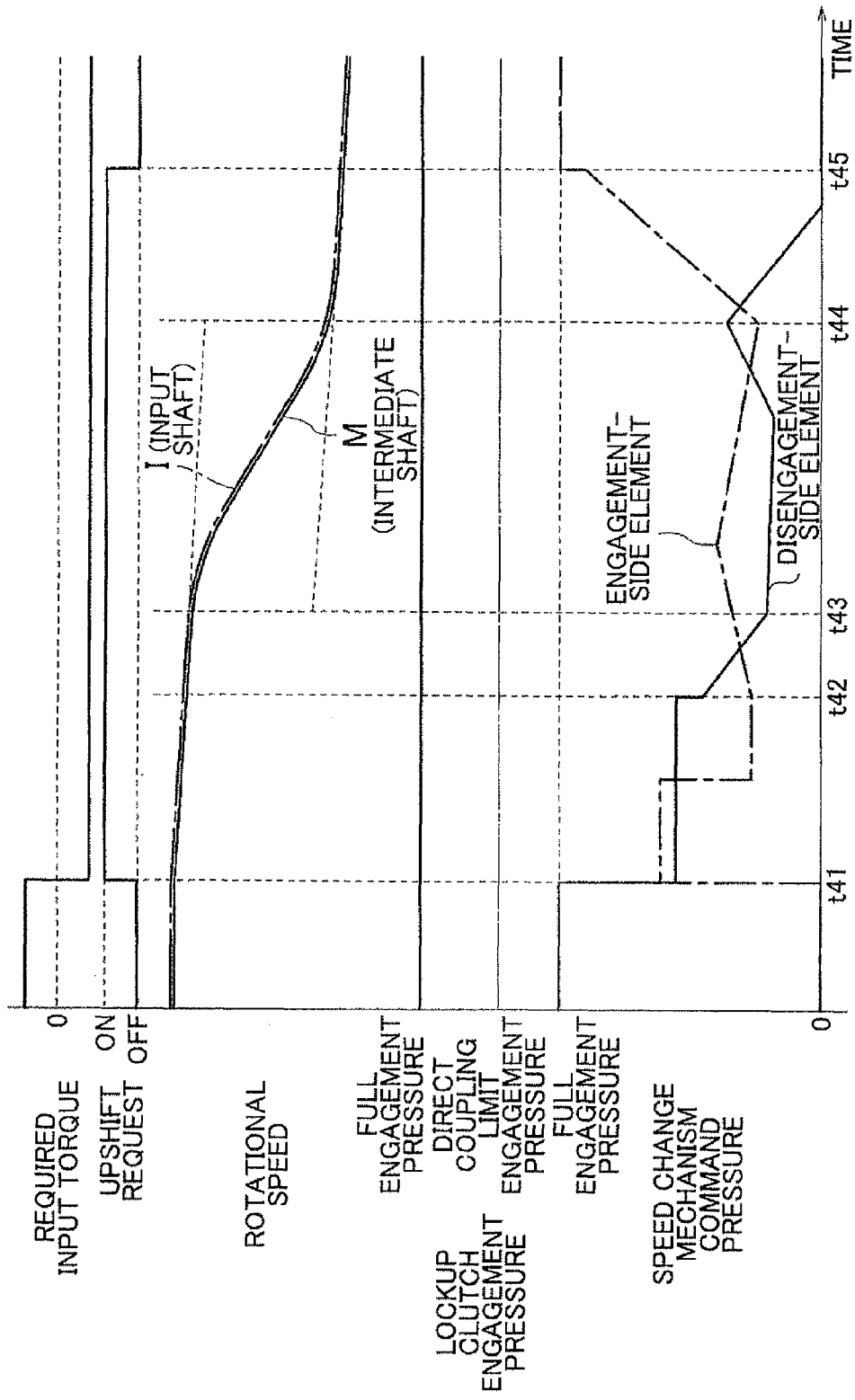
FIG. 7 is a timing chart illustrating processing of the control device according to the embodiment of the present invention.

The lockup cooperative shift control unit 41 starts the lockup cooperative shift control in the power-off upshift (at time t41 or later in FIG. 7) if there is an upshift request (at time t41 in FIG. 7), such as the accelerator operation amount decreasing to cross the upshift line as shown in the example of arrow 54 in FIG. 3, in the lockup clutch engaged state in which the engagement pressure of the lockup clutch LC is equal to or higher than the direct coupling limit engagement pressure (up to time t41 in FIG. 7). The rotating electrical machine MG outputs regenerative torque during the lockup cooperative shift control since the required input torque is negative. Note that the engagement pressure of the lockup clutch LC is controlled to the full engagement pressure until the lockup cooperative shift control is started (until time t41 in FIG. 7).

In this case, in the present embodiment, the lockup cooperative shift control unit 41 shifts the control phase from a normal control phase to a pre-control phase (at time t41 in FIG. 7). The pre-control phase is a phase in which the engagement pressures of the disengagement-side element and the engagement-side element of the speed change mechanism TM are changed in advance.

In the present embodiment, the lockup cooperative shift control unit 41 starts to control the oil pressure that is supplied to the engagement-side element to a predetermined engagement-side preliminary pressure in order to start generating the torque transfer capacity in the engagement-side element of the speed change mechanism TM. In this example, the engagement-side preliminary pressure is set to a pressure that is lower than the stroke end pressure by a predetermined pressure. As shown in the example of FIG. 7, after starting the control of the engagement-side preliminary pressure, the lockup cooperative shift control unit 41 instantaneously sets a command value higher than the engagement-side preliminary pressure to facilitate rising of an actual pressure.

After shifting to the pre-control phase, the lockup cooperative shift control unit 41 reduces the oil pressure being supplied to the disengagement-side element of the speed change mechanism TM, from the full engagement pressure to a disengagement-side preliminary pressure that is set according to the input torque that is transferred to the intermediate shaft M. The disengagement-side preliminary pressure is set to a pressure that is higher than a direct coupling limit pressure by a predetermined pressure. The direct coupling limit pressure is the minimum oil pressure at which the disengagement-side element can transfer all the required input torque to the wheel side.

In the present embodiment, the lockup cooperative shift control unit 41 maintains the engagement pressure of the lockup clutch LC at the full engagement pressure even after shifting to the pre-control phase (at time t41).

After a predetermined time period has elapsed following the reduction of the command value to the disengagement-side preliminary pressure (at time t42 in FIG. 7), the lockup cooperative shift control unit 41 further reduces the command value by a predetermined oil pressure in a stepwise fashion, and then gradually reduces the command value toward the direct coupling limit pressure. Note that the full engagement pressure is an oil pressure at which the friction engage element does not start to slip even when the required input torque is increased to the maximum value of the total output torque of the engine E and the rotating electrical machine MG as the driving force sources. In this example, after the predetermined time period has elapsed (at time t42 in FIG. 7), the lockup cooperative shift control unit 41 gradually increases the supply oil pressure of the engagement-side element from the engagement-side preliminary pressure. Due to this increase in the supply oil pressure of the engagement-side element, the torque transfer capacity is generated also in the engagement-side element. Thus, the rotational speed of the intermediate shaft M can be reduced to the target rotational speed of the higher gear-shift stage even when the magnitude of the negative required input torque is small.

3-6-4-2. Inertia Control Phase

The lockup cooperative shift control unit 41 shifts the control phase from the pre-control phase to an inertia control phase when the rotational speed of the intermediate shaft M starts to vary from the target rotational speed of the lower gear-shift stage (at time t43 in FIG. 7).

In the inertia control phase, the relation of the rotational speed is shifted from the state of the lower gear-shift stage to the state of the higher gear-shift stage, whereas the relation of the torque does not change significantly, and is maintained in the state of the lower gear-shift stage. The disengagement-side element is brought into a state in which the disengagement-side element transfers torque while slipping, and the engagement-side element is brought into a state in which the engagement-side element transfers a slight amount of torque. That is, in the inertia control phase, the relation of the torque transfer is substantially maintained as the relation of the lower gear-shift stage, and the relation of the rotational speed is shifted from the relation of the lower gear-shift stage to the relation of the higher gear-shift stage.

As the supply oil pressure of the disengagement-side element gradually decreases and becomes lower than the direct coupling limit pressure, the disengagement-side element can no longer transfer to the wheel side the entire input torque that is transferred to the intermediate shaft M. In this state, the part of the input torque which is not transferred to the wheel side serves as excess torque, and the excess torque acts only on the input member side of the disengagement-side element, whereby a rotational speed difference (slipping) between the rotational speed of the input member of the disengagement-side element and that the rotational speed of the output member of the disengagement-side element starts to occur. In the case where the required input torque is negative as in the power-off upshift, the excess torque is negative, and the rotational speed of the input member of the disengagement-side element becomes lower than that of the output member of the disengagement-side element, whereby the disengagement-side element starts to slip. Thus, the rotational speed of the intermediate shaft M starts to become lower the target rotational speed of the lower gear-shift stage. The lockup cooperative shift control unit 41 detects the variation of the rotational speed of the intermediate shaft M from the target rotational speed of the lower gear-shift stage, and shifts the control phase from the pre-control phase to the inertia control phase. Alternatively, the lockup cooperative shift control unit 41 may shift the control phase from the pre-control phase to the inertia control phase after a predetermined time period has elapsed following the start of the pre-control phase.

In the inertia control phase, the excess torque, which is the torque that is not transferred to the wheel side out of the input torque transferred to the intermediate shaft M, is controlled by controlling the supply oil pressure of the disengagement-side element to a torque lower than the direct coupling limit pressure, and the rotational speed of the intermediate shaft M is reduced to the target rotational speed of the higher gear-shift stage by using the excess torque. Since the torque transfer capacity of the engagement-side element is generated, such torque is generated that reduces the rotational speed of the intermediate shaft M to the target rotational speed of the higher gear-shift stage. By this torque of the engagement-side element, the rate at which the rotational speed of the intermediate shaft M decreases is increased and the upshift period can be reduced, even if the magnitude of the negative required input torque is small and the magnitude of the excess torque is small.

In the present embodiment, the lockup cooperative shift control unit 41 maintains the engagement pressure of the lockup clutch LC at the full engagement pressure even after shifting to the inertia phase (at time t43).

As the rotational speed of the intermediate shaft M gets closer to the target rotational speed of the higher gear-shift stage, the lockup cooperative shift control unit 41 increases the supply oil pressure of the disengagement-side element, and increases the torque transfer capacity of the disengagement-side element to increase the transferred torque, thereby reducing the magnitude of the excess torque and the rate at which the rotational speed of the intermediate shaft M decreases. As the rotational speed of the intermediate shaft M gets closer to the target rotational speed of the higher gear-shift stage, the lockup cooperative shift control unit 41 reduces the torque transfer capacity of the engagement-side element to reduce the transferred torque, thereby reducing the rate at which the rotational speed of the intermediate shaft M decreases. Thus, the rotational speed of the intermediate shaft M is synchronized with the target rotational speed of the higher speed. In the present embodiment, as the rotational speed of the intermediate shaft M gets closer to the target rotational speed of the higher gear-shift stage, the supply oil pressure of the disengagement-side element is increased and the supply oil pressure of the engagement-side element is reduced to a pressure close to the engagement-side preliminary pressure, so that the rate at which the rotational speed of the intermediate shaft M decreases at the time when the rotational speed of the intermediate shaft M reaches the target rotational speed of the higher gear-shift stage matches the rate at which the target rotational speed of the higher gear-shift stage decreases. The supply oil pressure of the disengagement-side element and the engagement-side element is changed in this manner by one or both of feedback control and feed forward control based on the rotational speed of the intermediate shaft M and the target rotational speed of the higher gear-shift stage.

In the present embodiment, the lockup cooperative shift control unit 41 maintains the engagement pressure of the lockup clutch LC at the full engagement pressure even after shifting to the inertia control phase (at time t43). Thus, regenerative torque can be transferred to the wheel side even during the shift operation, whereby reduction in regeneration efficiency can be prevented. As shown in the example of arrow 54 in FIG. 3, the power-off upshift is a shift operation that is performed when the required input torque is significantly reduced, but is not a shift operation that is performed at the time of acceleration such as the power-on downshift. Thus, it is less necessary to reduce the shift time, and the required input torque does not increase relatively. Thus, torque shock due to the shift operation is less likely to increase, and it is less necessary to reduce the torque shock by causing slipping of the lock up clutch LC.

3-6-4-3. Torque Control Phase

The lockup cooperative shift control unit 41 shifts the control phase from the inertia control phase to a torque control phase when it is determined that the rotational speed of the intermediate shaft M has been synchronized with the target rotational speed of the higher gear-shift stage (at time t44 in FIG. 7).

In the torque control phase, the relation of the torque is also shifted from the state of the lower gear-shift stage to the state of the higher gear-shift stage, and the torque sharing is completely shifted from the disengagement-side element to the engagement-side element. That is, in the torque control phase, not only the relation of the rotational speed but also the relation of the transferred torque are shifted from the state of the lower gear-shift stage to the state of the higher gear-shift stage.

The lockup cooperative shift control unit 41 gradually increases the supply oil pressure of the engagement-side element after shifting to the torque control phase, and increases the supply oil pressure of the engagement-side element to the full engagement pressure after a predetermined time period has elapsed following the shift to the torque control phase (at time t45 in FIG. 7). On the other hand, the lockup cooperative shift control unit 41 gradually reduces the supply oil pressure of the disengagement-side element to zero after shifting to the torque control phase. The lockup cooperative shift control unit 41 thus completes the lockup cooperative shift control in the power-off upshift.

Other Embodiments (1) The above embodiment is described with respect to an example in which the lockup cooperative shift control unit 41 sets the engagement pressure of the lockup clutch LC to the slipping engagement pressure in the inertia control phase in the power-on downshift. However, embodiments of the present invention are not limited to this. That is, the lockup cooperative shift control unit 41 need only set the engagement pressure of the lockup clutch LC to the slipping engagement pressure in the period of the power-on downshift including at least the period in which the rotational speed of the intermediate shaft M is changed to the target rotational speed of the lower gear-shift stage (in the present embodiment, the period of the inertia control phase). For example, it is also one of preferred embodiments of the present invention to set the engagement pressure of the lockup clutch LC to the slipping engagement pressure also in one or both of the period of the pre-control phase (from time t11 to t12 in FIG. 4) and the period (from time t13 to t14 in FIG. 4) from the time when the torque control phase is started to the time when the supply oil pressure of the engagement-side element is increased to the full engagement pressure, in addition to the period of the inertia control phase.

(2) The above embodiment is described with respect to an example in which the lockup cooperative shift control unit 41 sets the engagement pressure of the lockup clutch LC to the slipping engagement pressure in the power-on downshift. However, embodiments of the present invention are not limited to this. That is, the lockup cooperative shift control unit 41 need only set the engagement pressure of the lockup clutch to a pressure lower than the direct coupling limit engagement pressure in the power-on downshift. For example, it is one of preferred embodiments of the present invention to set the engagement pressure of the lockup clutch LC to zero.

(3) The above embodiment is described with respect to an example in which the lockup cooperative shift control unit 41 sets the engagement pressure of the lockup clutch LC to the direct coupling engagement pressure in the inertia control phase in the power-off downshift. However, embodiments of the present invention are not limited to this. That is, the lockup cooperative shift control unit 41 need only set the engagement pressure of the lockup clutch LC to the direct coupling engagement pressure in the period of the power-on downshift including at least the period in which the rotational speed of the intermediate shaft M is changed to the target rotational speed of the lower gear-shift stage (in the present embodiment, the period of the inertia control phase). For example, it is also one of preferred embodiments of the present invention to set the engagement pressure of the lockup clutch LC to the direct coupling engagement pressure also in one or both of the period of the pre-control phase (from time t21 to t22 in FIG. 5) and the period of the torque control phase (from time t22 to t23 in FIG. 5), in addition to the period of the inertia control phase.

(4) The above embodiment is described with respect to an example in which the lockup cooperative shift control unit 41 sets the engagement pressure of the lockup clutch LC to the direct coupling engagement pressure in the power-off downshift. However, embodiments of the present invention are not limited to this. That is, the lockup cooperative shift control unit 41 need only set the engagement pressure of the lockup clutch to a pressure equal to or higher than the direct coupling limit engagement pressure in the power-off downshift. For example, it is also one of preferred embodiments of the present invention to set the engagement pressure of the lockup clutch to the full engagement pressure.

(5) The above embodiment is described with respect to an example in which the lockup cooperative shift control unit 41 sets the engagement pressure of the lockup clutch LC to the full engagement pressure in the power-on upshift and the power-off upshift. However, embodiments of the present invention are not limited to this. That is, the lockup cooperative shift control unit 41 need only set the engagement pressure of the lockup clutch to a pressure equal to or higher than the direct coupling limit engagement pressure in the power-on upshift or the power-off upshift. For example, it is also one of preferred embodiments of the present invention to set the engagement pressure of the lockup clutch to a pressure lower than the full engagement pressure, such as a pressure that is about the same as the direct coupling engagement pressure in the power-off downshift.

The present invention can be preferably used in control devices for controlling a hybrid vehicle drive device that includes an input member drivingly coupled to at least one of an internal combustion engine and a rotating electrical machine as driving force sources of a vehicle, an output member drivingly coupled to wheels, a fluid coupling with a direct coupling clutch for transmitting rotation of the input member to a shift input member, and a speed change mechanism for shifting rotation of the shift input member at a speed ratio of a gear-shift stage that is selectively formed, and transmitting the shifted rotation to the output member.

What is claimed is:
1. A control device for controlling a hybrid vehicle drive device that includes an input member drivingly coupled to at least one of an internal combustion engine and a rotating electrical machine as driving force sources of a vehicle, an output member drivingly coupled to a wheel, a fluid coupling with a direct coupling clutch for transmitting rotation of the input member to a shift input member, and a speed change mechanism for shifting rotation of the shift input member at a speed ratio of a gear-shift stage that is selectively formed, and transmitting the shifted rotation to the output member, wherein when performing a downshift to a gear-shift stage of a higher speed ratio or an upshift to a gear-shift stage of a lower speed ratio in the speed change mechanism from a state in which an engagement pressure of the direct coupling clutch is equal to or higher than a direct coupling limit engagement pressure that is an engagement pressure at which the direct coupling clutch starts to slip, the control device controls the engagement pressure of the direct coupling clutch to a pressure lower than the direct coupling limit engagement pressure during the downshift, when performing the downshift in a state in which required input torque, which is torque that is required to be transferred to the input member, is set to a positive torque, and the control device controls the engagement pressure of the direct coupling clutch to a pressure equal to or higher than the direct coupling limit engagement pressure during the downshift or the upshift, when performing the downshift in a state in which the required input torque is set to a negative torque, or when performing the upshift regardless of the required input torque.

2. The control device according to claim 1, wherein when performing the downshift in the state in which the required input torque is set to the positive torque, the control device controls the engagement pressure of the direct coupling clutch to a slipping engagement pressure at which slipping occurs, during the downshift, and the slipping engagement pressure is set to a larger pressure as an absolute value of the required input torque increases.

3. The control device according to claim 2, wherein when performing the upshift regardless of the required input torque, the control device controls the engagement pressure of the direct coupling clutch to an upshift direct coupling engagement pressure that is equal to or higher than the direct coupling limit engagement pressure during the upshift, and the upshift direct coupling engagement pressure is set to a full engagement pressure regardless of a magnitude of the required input torque, and the full engagement pressure is a pressure at which the direct coupling clutch does not slip even when the required input torque has a maximum value.

4. The control device according to claim 2, wherein when performing the downshift in the state in which the required input torque is set to the negative torque, the control device controls the engagement pressure of the direct coupling clutch to a direct coupling engagement pressure that is equal to or higher than the direct coupling limit engagement pressure during the downshift, and the direct coupling engagement pressure is set to a larger pressure as the absolute value of the required input torque increases.

5. The control device according to claim 4, wherein when performing the upshift regardless of the required input torque, the control device controls the engagement pressure of the direct coupling clutch to an upshift direct coupling engagement pressure that is equal to or higher than the direct coupling limit engagement pressure during the upshift, and the upshift direct coupling engagement pressure is set to a full engagement pressure regardless of a magnitude of the required input torque, and the full engagement pressure is a pressure at which the direct coupling clutch does not slip even when the required input torque has a maximum value.

6. The control device according to claim 1, wherein when performing the downshift in the state in which the required input torque is set to the negative torque, the control device controls the engagement pressure of the direct coupling clutch to a direct coupling engagement pressure that is equal to or higher than the direct coupling limit engagement pressure during the downshift, and the direct coupling engagement pressure is set to a larger pressure as the absolute value of the required input torque increases.

7. The control device according to claim 6, wherein when performing the upshift regardless of the required input torque, the control device controls the engagement pressure of the direct coupling clutch to an upshift direct coupling engagement pressure that is equal to or higher than the direct coupling limit engagement pressure during the upshift, and the upshift direct coupling engagement pressure is set to a full engagement pressure regardless of a magnitude of the required input torque, and the full engagement pressure is a pressure at which the direct coupling clutch does not slip even when the required input torque has a maximum value.

8. The control device according to claim 1, wherein when performing the upshift regardless of the required input torque, the control device controls the engagement pressure of the direct coupling clutch to an upshift direct coupling engagement pressure that is equal to or higher than the direct coupling limit engagement pressure during the upshift, and the upshift direct coupling engagement pressure is set to a full engagement pressure regardless of a magnitude of the required input torque, and the full engagement pressure is a pressure at which the direct coupling clutch does not slip even when the required input torque has a maximum value.

\* \* \* \* \*